United States Patent
Loheide et al.

(10) Patent No.: US 11,632,589 B2
(45) Date of Patent: *Apr. 18, 2023

(54) CLIENT-SIDE OVERLAY OF GRAPHIC HEMS ON MEDIA CONTENT

(71) Applicant: Turner Broadcasting System, Inc., Atlanta, GA (US)

(72) Inventors: Donald Jude Loheide, Mableton, GA (US); Matthew Paul Giles, Marietta, GA (US); Gregory McClain Stigall, Douglasville, GA (US); Nishith Kumar Sinha, Mableton, GA (US); Cindy Loren Campbell, Atlanta, GA (US); James J Arnzen, Atlanta, GA (US); Nicolas Paul Webb, McDonough, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,666

(22) Filed: Mar. 7, 2022

(65) Prior Publication Data

US 2022/0201361 A1 Jun. 23, 2022

Related U.S. Application Data

(63) Continuation of application No. 17/326,258, filed on May 20, 2021, now Pat. No. 11,432,044, which is a
(Continued)

(51) Int. Cl.
H04N 21/458 (2011.01)
H04L 67/01 (2022.01)
(Continued)

(52) U.S. Cl.
CPC ....... *H04N 21/458* (2013.01); *G06Q 30/0242* (2013.01); *G06Q 30/0251* (2013.01);
(Continued)

(58) Field of Classification Search
CPC ........... H04N 21/233; H04N 21/23418; H04N 21/23424; H04N 21/2353; H04N 21/2387;
(Continued)

(56) References Cited

U.S. PATENT DOCUMENTS 6,701,355 B1 3/2004 Brandt et al.
8,099,757 B2 1/2012 Riedl et al.
(Continued)

FOREIGN PATENT DOCUMENTS

KR 101061952 B1 9/2011

OTHER PUBLICATIONS

Corrected Notice of Allowance for U.S. Appl. No. 15/396,468 dated Apr. 1, 2022.
(Continued)

*Primary Examiner* — Nicholas T Corbo
(74) *Attorney, Agent, or Firm* — Chip Law Group

(57) ABSTRACT

A media presentation and distribution system communicatively coupled to a client device is provided. The client device receives a media stream from the media presentation and distribution system via a network. The media stream includes media content and one or more tags. The client device further identifies in the received media content, the one or more tags, which corresponds to the overlay-graphic items. The client device further identifies candidate time-periods in the media content based on the one or more tags in the media content. At least one presentation attribute for the overlay-graphic items is identified based on the one or more tags in the media content. The client device further
(Continued)

presents the overlay-graphic items at the candidate time-periods on the media content based on a degree of correlation between the identified tag in the media content and a corresponding context for the media content at the candidate time-period.

20 Claims, 8 Drawing Sheets

Related U.S. Application Data continuation of application No. 15/986,268, filed on May 22, 2018, now Pat. No. 11,051,073.

(60) Provisional application No. 62/511,190, filed on May 25, 2017.

(51) Int. Cl.

| | | |
|---|---|---|
| *H04N 21/8545* | (2011.01) | |
| *H04L 65/612* | (2022.01) | |
| *H04L 67/60* | (2022.01) | |
| *G06Q 30/0242* | (2023.01) | |
| *G06Q 30/0251* | (2023.01) | |
| *G06Q 30/0273* | (2023.01) | |
| *G06Q 30/0601* | (2023.01) | |
| *H04L 9/32* | (2006.01) | |
| *H04L 65/60* | (2022.01) | |
| *H04L 67/1097* | (2022.01) | |
| *H04L 67/125* | (2022.01) | |
| *H04L 67/306* | (2022.01) | |
| *H04N 21/233* | (2011.01) | |
| *H04N 21/234* | (2011.01) | |
| *H04N 21/235* | (2011.01) | |
| *H04N 21/2387* | (2011.01) | |
| *H04N 21/2389* | (2011.01) | |
| *H04N 21/239* | (2011.01) | |
| *H04N 21/24* | (2011.01) | |
| *H04N 21/2543* | (2011.01) | |
| *H04N 21/258* | (2011.01) | |
| *H04N 21/262* | (2011.01) | |
| *H04N 21/266* | (2011.01) | |
| *H04N 21/2668* | (2011.01) | |
| *H04N 21/431* | (2011.01) | |
| *H04N 21/435* | (2011.01) | |
| *H04N 21/44* | (2011.01) | |
| *H04L 67/51* | (2022.01) | |
| *H04N 21/472* | (2011.01) | |
| *H04N 21/478* | (2011.01) | |
| *H04N 21/6332* | (2011.01) | |
| *H04N 21/6587* | (2011.01) | |
| *H04N 21/81* | (2011.01) | |
| *H04N 21/835* | (2011.01) | |
| *H04N 21/84* | (2011.01) | |
| *H04N 21/845* | (2011.01) | |
| *H04H 20/10* | (2008.01) | |
| *H04N 21/8358* | (2011.01) | |

(52) U.S. Cl.
CPC ..... *G06Q 30/0275* (2013.01); *G06Q 30/0633* (2013.01); *H04L 9/32* (2013.01); *H04L 65/60* (2013.01); *H04L 65/612* (2022.05); *H04L 67/01* (2022.05); *H04L 67/1097* (2013.01); *H04L 67/125* (2013.01); *H04L 67/306* (2013.01); *H04L 67/51* (2022.05); *H04L 67/60* (2022.05); *H04N 21/233* (2013.01); *H04N 21/2353* (2013.01); *H04N 21/2387* (2013.01); *H04N 21/2393* (2013.01); *H04N 21/23418* (2013.01); *H04N 21/23424* (2013.01); *H04N 21/23892* (2013.01); *H04N 21/24* (2013.01); *H04N 21/2543* (2013.01); *H04N 21/25883* (2013.01); *H04N 21/25891* (2013.01); *H04N 21/266* (2013.01); *H04N 21/2668* (2013.01); *H04N 21/26208* (2013.01); *H04N 21/26241* (2013.01); *H04N 21/435* (2013.01); *H04N 21/4312* (2013.01); *H04N 21/4316* (2013.01); *H04N 21/44008* (2013.01); *H04N 21/44016* (2013.01); *H04N 21/47217* (2013.01); *H04N 21/47815* (2013.01); *H04N 21/6332* (2013.01); *H04N 21/6587* (2013.01); *H04N 21/812* (2013.01); *H04N 21/835* (2013.01); *H04N 21/84* (2013.01); *H04N 21/845* (2013.01); *H04N 21/8545* (2013.01); *G06Q 2220/00* (2013.01); *H04H 20/10* (2013.01); *H04N 21/8358* (2013.01)

(58) Field of Classification Search
CPC ......... H04N 21/23892; H04N 21/2393; H04N 21/24; H04N 21/2543; H04N 21/25883; H04N 21/25891; H04N 21/26208; H04N 21/26241; H04N 21/266; H04N 21/2668; H04N 21/4312; H04N 21/4316; H04N 21/435; H04N 21/44008; H04N 21/44016; H04N 21/458; H04N 21/47217; H04N 21/47815; H04N 21/63332; H04N 21/6587; H04N 21/812; H04N 21/835; H04N 21/8358; H04N 21/84; H04N 21/845; H04N 21/8545; G06Q 30/0242; G06Q 30/0251; G06Q 30/0275; G06Q 30/0633; H04L 9/32; H04L 65/4084; H04L 65/60; H04L 67/1097; H04L 67/125; H04L 67/16; H04L 67/306; H04L 67/32; H04L 67/42
See application file for complete search history.

(56) References Cited

U.S. PATENT DOCUMENTS

| | | |
|---|---|---|
| 8,132,203 B2 | 3/2012 | Heer |
| 8,458,053 B1 | 6/2013 | Buron et al. |
| 8,600,382 B2 | 12/2013 | Hicks, III |
| 8,842,879 B2 | 9/2014 | Laksono et al. |
| 8,954,521 B1 | 2/2015 | Faaborg et al. |
| 9,380,264 B1 | 6/2016 | Vakalapudi |
| 10,045,091 B1 | 8/2018 | Nijim et al. |
| 2002/0112239 A1 | 8/2002 | Goldman |
| 2004/0031056 A1 | 2/2004 | Wolff |
| 2004/0163103 A1 | 8/2004 | Swix et al. |
| 2005/0015816 A1 | 1/2005 | Christofalo et al. |
| 2005/0060745 A1 | 3/2005 | Riedl et al. |
| 2005/0096978 A1 | 5/2005 | Black |
| 2006/0064730 A1 | 3/2006 | Rael et al. |
| 2006/0122916 A1 | 6/2006 | Kassan |
| 2006/0287915 A1 | 12/2006 | Boulet et al. |
| 2009/0070808 A1 | 3/2009 | Jacobs |
| 2009/0285217 A1 | 11/2009 | Frink et al. |
| 2009/0287790 A1 | 11/2009 | Upton et al. |
| 2010/0010899 A1 | 1/2010 | Lambert et al. |
| 2010/0125880 A1 | 5/2010 | Roewe |
| 2010/0287297 A1 | 11/2010 | Lefebvre |
| 2011/0052144 A1 | 3/2011 | Abbas et al. |
| 2011/0123062 A1 | 5/2011 | Hilu |
| 2011/0177775 A1 | 7/2011 | Gupta et al. |
| 2011/0209181 A1 | 8/2011 | Gupta et al. |
| 2011/0246202 A1 | 10/2011 | McMillan et al. |
| 2012/0271942 A1 | 10/2012 | Walker et al. |
| 2013/0085851 A1 | 4/2013 | Pedro et al. |
| 2013/0205212 A1 | 8/2013 | Sinha et al. |

(56) References Cited

U.S. PATENT DOCUMENTS

| | | |
|---|---|---|
| 2013/0263182 A1 | 10/2013 | Ivy et al. |
| 2013/0276023 A1 | 10/2013 | Kent et al. |
| 2014/0013354 A1 | 1/2014 | Johnson et al. |
| 2014/0020017 A1 | 1/2014 | Stern et al. |
| 2014/0071818 A1 | 3/2014 | Wang et al. |
| 2014/0152894 A1 | 6/2014 | Childs et al. |
| 2014/0189514 A1 | 7/2014 | Hilliard |
| 2014/0270338 A1 | 9/2014 | Zhao et al. |
| 2015/0106856 A1 | 4/2015 | Rankine |
| 2015/0237386 A1 | 8/2015 | Sheehan et al. |
| 2015/0289022 A1 | 10/2015 | Gross |
| 2015/0381936 A1 | 12/2015 | Goyal et al. |
| 2016/0077710 A1 | 3/2016 | Lewis et al. |
| 2016/0127788 A1 | 5/2016 | Roberts et al. |
| 2016/0165306 A1 | 6/2016 | Nam |
| 2016/0308958 A1 | 10/2016 | Navali et al. |
| 2016/0345074 A1 | 11/2016 | Serbest et al. |
| 2017/0055012 A1 | 2/2017 | Phillips et al. |
| 2017/0070789 A1 | 3/2017 | Liassides et al. |
| 2017/0099506 A1 | 4/2017 | Grover |
| 2017/0099511 A1 | 4/2017 | Grover |
| 2017/0118537 A1 | 4/2017 | Stransky-Heilkron et al. |
| 2017/0118538 A1 | 4/2017 | Ashbacher |
| 2017/0195718 A1 | 7/2017 | Nair et al. |
| 2017/0289597 A1 | 10/2017 | Riedel et al. |
| 2018/0007060 A1 | 1/2018 | Leblang et al. |
| 2018/0165650 A1 | 6/2018 | Kashyape et al. |
| 2018/0184047 A1 | 6/2018 | Simonsen et al. |
| 2018/0367823 A1 | 12/2018 | Brinkley et al. |
| 2019/0068665 A1 | 2/2019 | Kieft et al. |
| 2019/0364317 A1 | 11/2019 | Milford |
| 2019/0380021 A1 | 12/2019 | Meek et al. |
| 2020/0244778 A1 | 7/2020 | Berookhim et al. |

OTHER PUBLICATIONS

Corrected Notice of Allowance for U.S. Appl. No. 16/985,444 dated Apr. 20, 2022.
Corrected Notice of Allowance for U.S. Appl. No. 16/985,444 dated Jun. 1, 2022.
Corrected Notice of Allowance for U.S. Appl. No. 16/985,444 dated Mar. 25, 2022.
Corrected Notice of Allowance for U.S. Appl. No. 17/016,789 dated May 18, 2022.
Corrected Notice of Allowance for U.S. Appl. No. 17/017,145 dated Jun. 2, 2022.
Corrected Notice of Allowance for U.S. Appl. No. 17/017,145 dated May 17, 2022.
Corrected Notice of Allowance for U.S. Appl. No. 17/038,323 dated Apr. 19, 2022.
Corrected Notice of Allowance for U.S. Appl. No. 17/038,323 dated May 26, 2022.
Corrected Notice of Allowance for U.S. Appl. No. 17/094,102 dated Apr. 20, 2022.
Corrected Notice of Allowance for U.S. Appl. No. 17/094,102 dated Mar. 10, 2022.
Corrected Notice of Allowance for U.S. Appl. No. 17/094,102 dated May 17, 2022.
Corrected Notice of Allowance for U.S. Appl. No. 17/094,319 dated May 17, 2022.
Corrected Notice of Allowance for U.S. Appl. No. 17/147,887 dated May 18, 2022.
Corrected Notice of Allowance for U.S. Appl. No. 17/326,258 dated Apr. 19, 2022.
Corrected Notice of Allowance for U.S. Appl. No. 17/326,258 dated Mar. 14, 2022.
Corrected Notice of Allowance for U.S. Appl. No. 17/340,166 dated Jun. 2, 2022.
Final Office Action for U.S. Appl. No. 15/988,572 dated Mar. 10, 2022.
Final Office Action for U.S. Appl. No. 17/017,241 dated Apr. 28, 2022.
Non-Final Office Action for U.S. Appl. No. 16/918,085 dated Mar. 31, 2022.
Notice of Allowability for U.S. Appl. No. 16/895,439 dated May 16, 2022.
Notice of Allowability for U.S. Appl. No. 16/902,893 dated May 13, 2022.
Notice of Allowance for U.S. Appl. No. 15/396,468 dated Mar. 18, 2022.
Notice of Allowance for U.S. Appl. No. 17/094,319 dated Apr. 12, 2022.
Notice of Allowance for U.S. Appl. No. 17/147,887 dated Apr. 19, 2022.
Notice of Allowance for U.S. Appl. No. 17/326,258 dated Apr. 27, 2022.
Notice of Allowance for U.S. Appl. No. 17/340,166 dated Mar. 21, 2022.
Corrected Notice of Allowance for U.S. Appl. No. 15/396,468 dated Aug. 26, 2022.
Corrected Notice of Allowance for U.S. Appl. No. 15/396,468 dated Jun. 24, 2022.
Corrected Notice of Allowance for U.S. Appl. No. 17/016,789 dated Jun. 27, 2022.
Corrected Notice of Allowance for U.S. Appl. No. 17/017,052 dated Aug. 1, 2022.
Corrected Notice of Allowance for U.S. Appl. No. 17/017,052 dated Jun. 15, 2022.
Corrected Notice of Allowance for U.S. Appl. No. 17/017,145 dated Jul. 22, 2022.
Corrected Notice of Allowance for U.S. Appl. No. 17/017,241 dated Aug. 3, 2022.
Corrected Notice of Allowance for U.S. Appl. No. 17/094,102 dated Aug. 3, 2022.
Corrected Notice of Allowance for U.S. Appl. No. 17/094,102 dated Jun. 24, 2022.
Corrected Notice of Allowance for U.S. Appl. No. 17/094,319 dated Aug. 1, 2022.
Corrected Notice of Allowance for U.S. Appl. No. 17/094,319 dated Jun. 15, 2022.
Corrected Notice of Allowance for U.S. Appl. No. 17/147,887 dated Jul. 22, 2022.
Corrected Notice of Allowance for U.S. Appl. No. 17/340,166 dated Aug. 22, 2022.
Corrected Notice of Allowance for U.S. Appl. No. 17/340,166 dated Jul. 5, 2022.
Final Office Action for U.S. Appl. No. 16/854,970 dated Aug. 18, 2022.
Non-Final Office Action for U.S. Appl. No. 17/206,473 dated Jun. 22, 2022.
Non-Final Office Action for U.S. Appl. No. 17/326,281 dated Aug. 18, 2022.
Non-Final Office Action for U.S. Appl. No. 17/206,737 dated Jun. 23, 2022.
Non-Final Office Action for U.S. Appl. No. 17/527,817 dated Jun. 15, 2022.
Notice of Allowability for U.S. Appl. No. 16/092,893 dated Jun. 8, 2022.
Notice of Allowability for U.S. Appl. No. 16/895,439 dated Jul. 20, 2022.
Notice of Allowability for U.S. Appl. No. 16/895,439 dated Jun. 8, 2022.
Notice of Allowability for U.S. Appl. No. 16/902,893 dated Jul. 20, 2022.
Notice of Allowance for U.S. Appl. No. 17/017,241 dated Jul. 15, 2022.
Notice of Allowance for U.S. Appl. No. 17/340,677 dated Aug. 8, 2022.
Corrected Notice of Allowance for U.S. Appl. No. 15/396,468 dated Oct. 17, 2022.
Corrected Notice of Allowance for U.S. Appl. No. 16/895,439 dated Sep. 14, 2022.

(56) References Cited

OTHER PUBLICATIONS

Corrected Notice of Allowance for U.S. Appl. No. 16/902,893 dated Sep. 19, 2022.
Corrected Notice of Allowance for U.S. Appl. No. 17/017,145 dated Sep. 15, 2022.
Corrected Notice of Allowance for U.S. Appl. No. 17/017,241 dated Dec. 2, 2022.
Corrected Notice of Allowance for U.S. Appl. No. 17/017,241 dated Oct. 20, 2022.
Corrected Notice of Allowance for U.S. Appl. No. 17/094,319 dated Sep. 23, 2022.
Corrected Notice of Allowance for U.S. Appl. No. 17/147,887 dated Oct. 11, 2022.
Corrected Notice of Allowance for U.S. Appl. No. 17/340,166 dated Sep. 23, 2022.
Corrected Notice of Allowance for U.S. Appl. No. 17/340,677 dated Nov. 14, 2022.
Corrected Notice of Allowance for U.S. Appl. No. 17/340,677 dated Oct. 21, 2022.
Final Office Action for U.S. Appl. No. 16/918,085 dated Oct. 24, 2022.
Final Office Action for U.S. Appl. No. 17/206,473 dated Sep. 8, 2022.
Non-Final Office Action for U.S. Appl. No. 15/988,572 dated Oct. 6, 2022.
Non-Final Office Action for U.S. Appl. No. 17/016,789 dated Sep. 22, 2022.
Non-Final Office Action for U.S. Appl. No. 17/340,538 dated Oct. 3, 2022.
Non-Final Office Action for U.S. Appl. No. 17/408,680 dated Sep. 15, 2022.
Non-Final Office Action for U.S. Appl. No. 17/453,628 dated Sep. 27, 2022.
Non-Final Office Action for U.S. Appl. No. 17/830,587 dated Nov. 25, 2022.
Notice of Allowance for U.S. Appl. No. 16/854,970 dated Oct. 13, 2022.
Notice of Allowance for U.S. Appl. No. 17/306,758 dated Sep. 16, 2022.
Notice of Allowance for U.S. Appl. No. 17/326,281 dated Dec. 7, 2022.
Notice of Allowance for U.S. Appl. No. 17/527,817 dated Oct. 3, 2022.
Notice of Allowance for U.S. Appl. No. 17/839,649 dated Oct. 19, 2022.
Notice of Allowance for U.S. Appl. No. 17/839,882 dated Oct. 26, 2022.
Notice of Allowance for U.S. Appl. No. 17/858,698 dated Oct. 4, 2022.
Corrected Notice of Allowance for U.S. Appl. No. 17/340,677 dated Dec. 9, 2022.
Non-Final Office Action for U.S. Appl. No. 17/366,738 dated Dec. 9, 2022.
Notice of Allowance for U.S. Appl. No. 17/830,788 dated Dec. 9, 2022.
Corrected Notice of Allowance for U.S. Appl. No. 16/854,970 dated Jan. 23, 2023.
Corrected Notice of Allowance for U.S. Appl. No. 16/854,970 dated Jan. 5, 2023.
Corrected Notice of Allowance for U.S. Appl. No. 17/306,758 dated Dec. 21, 2022.
Corrected Notice of Allowance for U.S. Appl. No. 17/306,758 dated Jan. 5, 2023.
Corrected Notice of Allowance for U.S. Appl. No. 17/326,281 dated Dec. 22, 2022.
Corrected Notice of Allowance for U.S. Appl. No. 17/340,256 dated Jan. 6, 2023.
Corrected Notice of Allowance for U.S. Appl. No. 17/839,882 dated Dec. 23, 2022.
Corrected Notice of Allowance for U.S. Appl. No. 17/858,698 dated Dec. 28, 2022.
Corrected Notice of Allowance for U.S. Appl. No. 17/858,698 dated Jan. 12, 2023.
Final Office Action for U.S. Appl. No. 17/206,737 dated Jan. 2, 2023.
Final Office Action for U.S. Appl. No. 17/408,680 dated Jan. 12, 2023.
Final Office Action for U.S. Appl. No. 17/408,739 dated Jan. 12, 2023.
Non-Final Office Action for U.S. Appl. No. 17/206,473 dated Dec. 22, 2022.
Non-Final Office Action for U.S. Appl. No. 17/708,241 dated Dec. 20, 2022.
Notice of Allowability for U.S. Appl. No. 17/839,649 dated Jan. 25, 2023.
Notice of Allowance for U.S. Appl. No. 16/918,085 dated Jan. 13, 2023.
Notice of Allowance for U.S. Appl. No. 17/340,538 dated Jan. 23, 2023.
Supplemental Notice of Allowance for U.S. Appl. No. 17/527,817 dated Jan. 5, 2023.
Notice of Allowance for U.S. Appl. No. 17/731,049 dated Mar. 2, 2023
Notice of Allowance for U.S. Appl. No. 17/453,628 dated Mar. 2, 2023.
Notice of Allowance for U.S. Appl. No. 17/830,587 dated Mar. 9, 2023.

CLIENT-SIDE OVERLAY OF GRAPHIC ITEMS ON MEDIA CONTENT

CROSS-REFERENCE TO RELATED APPLICATIONS/INCORPORATION BY REFERENCE

This Application makes reference to, and claims priority to, and claims benefit of, and is a Continuation Application of U.S. patent application Ser. No. 17/326,258, filed May 20, 2021, which is a Continuation Application of U.S. Pat. No. 11,051,073, issued Jun. 29, 2021, which claims priority to U.S. Provisional Patent Application Ser. 62/511,190, which was filed on May 25, 2017.

Each of the above referenced application is hereby incorporated herein by reference in its entirety.

FIELD OF TECHNOLOGY

Certain embodiments of the present disclosure relate to television and broadcasting technologies. More specifically, certain embodiments of the present disclosure relate to client-side presentation of overlay-graphic items on media content.

BACKGROUND

Recent advancements in the television and broadcasting industry has led to the development of various communication technologies and broadcasting platforms. Such communication technologies and broadcasting platforms are revolutionizing the way channel content is generated and presented to users. Currently, there is massive competition amongst the broadcasting platforms that are striving to increase their visual appeal in order to gain wider audience. The television viewing market is no longer exclusively concerned that whether channel content is viewed on a dedicated television or another device capable of playing channel content. Due to penetration of new technologies in the television and broadcasting sector, it is evident that the success of television broadcasting will be dependent on the ability of the network provider to gain access to the channel content demanded by the users, and to differentiate their offering from that of incumbent broadcasters or find new modes of content delivery.

Increased competition has led the broadcast providers (or the network providers) to differentiate their offering and provide services that may concurrently handle multiple channels. However, this has resulted in unparalleled levels of system complexity at the hardware systems of the broadcast providers, which requires installation of large infrastructures and resources to handle and maintain uninterrupted content delivery for existing channel and also meet the ever increasing demand for content. Additionally, broadcasters and content providers face many challenges related to maintenance of uniform visual quality while delivering graphical ads, bugs, logos, and banners, during presentation of media content on client devices. Such challenges or issues are often caused by variations in network bandwidth. As broadcasters and content providers utilize adaptive bitrate streams to seamlessly present media content and such overlay-graphics are usually encoded on the media content at the server side, any limiting variations in network-bandwidth downgrades the quality of the overlay-graphics, along with the presented media content. A system is required that facilitates the client-side device to present overlay graphics that is agnostic of variations in the network-bandwidth, with the capability to provide enhanced viewer experience, and thereby increase appeal in order to gain wider audience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and methods are provided for client-side presentation of overlay-graphic items on media content, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
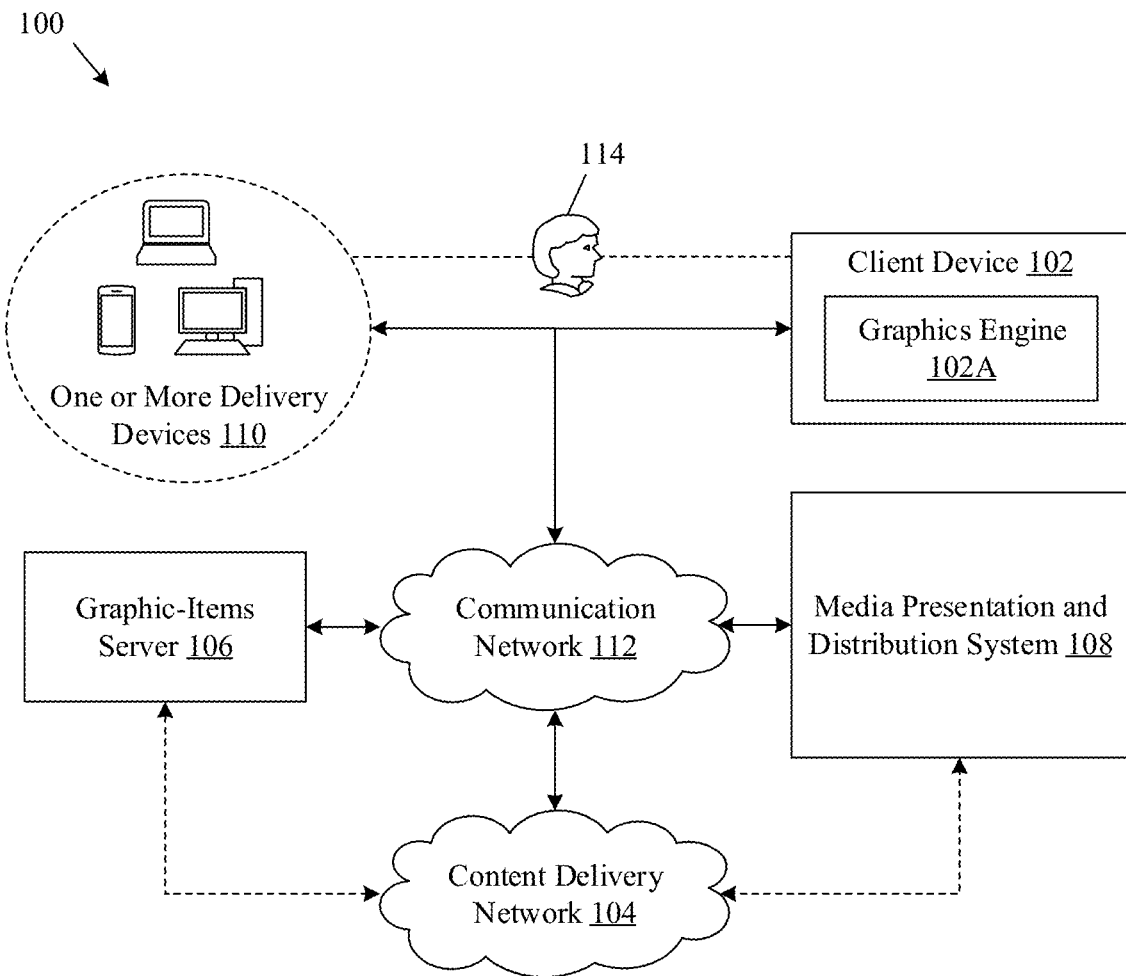
FIG. 1 is a block diagram that illustrates an exemplary network environment for client-side presentation of overlay-graphic items on media content, in accordance with various exemplary embodiments of the present disclosure.

Certain embodiments of the present disclosure may be found in a method and system for client-side presentation of overlay-graphic items on media content (which include programming media content and non-programming media content). Examples of the overlay-graphic items may include, but are not limited to, logos, tickers, bugs, banners, popups, lower third graphics (also referred to as $⅓^{rd}$ graphics), digital video effects (DVE) squeezes, and sliders. As the media content is personalized for a user associated with a client device, it is difficult to present personalized overlay-graphics at defined positions on the media content, such as VOD media content, during playback at client-side. Further, if the overlay-graphic items are pre-encoded with the media content at the server-side then the quality of the overlay-graphic items varies with bandwidth of communication network used to deliver content to the client device. Thus, there is a need to present personalized overlay-graphic items that exhibit a quality that is agnostic of variations in bandwidth of the communication network associated with the client device. There is a further need to facilitate personalization of overlay-graphic items on personalized media streams, such as VOD media streams, at the client device without a network-congestion and without an adverse effect on performance of the client device.

The operations related to presentation of overlay-graphic items on the media content, are primarily executed by the client device under instructions and decisions of a server (or media presentation and distribution system). The server (or media presentation and distribution system) identifies, tags, packages and transmits media stream of the media content and overlay-graphic items to the client device. The server further decides which overlay-graphic item should be presented at the client device at what duration. The client device may be instructed to execute certain operations related to identification of relevant durations for the presentation of media items, encode or overlay such media items, and present such overlaid overlay-graphic items for the relevant durations.

With such efficient distribution of operations between the client-side and server-side, the network-bandwidth of communication network is optimally utilized, which further renders sufficient bandwidth for the client device to maintain a quality of the streamed media content. The present disclosure provides a way to shift primary operations on the client device without an impact on a power consumption, a battery-usage, or availability of computational-resources for other processes on the client device. Advantageously, as the client device personalizes the presentation of the overlay-graphic items on the media content at relevant time-periods, the viewing experience of all the subscribed users is significantly enhanced even in fluctuating network bandwidth, which in turn may ensure not only retaining of subscriber base of users, but also increase wider audience.

FIG. 1 is a block diagram that illustrates an exemplary network environment for client-side presentation of overlay-graphic items on personalized media content, in accordance with various exemplary embodiments of the disclosure. In FIG. 1, there is shown a network environment 100 that comprises a client device 102, a content delivery network (CDN) 104, a graphic-items server 106, a media presentation and distribution system 108, and one or more delivery devices 110, communicatively coupled to a communication network 112. The CDN 104 may include a video-on-demand (VOD) media server 104A. Additionally, FIG. 1 illustrates a user 114 associated with the client device 102 and the one or more delivery devices 110. The client device 102 may comprise a graphics engine 102A to overlay and present one or more overlay-graphic items (or overlay graphics) on the media content. The media content may include programming media content (e.g. television shows, on demand shows), non-programming media content (e.g. video advertisements, promotional videos), and/or a combination of both the programming media content and the non-programming media content. Alternatively, a plurality of overlay-graphic items may be presented on the media content. Hereinafter, the plurality of overlay graphic-items may be interchangeably referred to as overlay-graphic items.

The client device 102 may comprise suitable logic, circuitry, and interfaces that may be configured to execute operations to overlay and present the overlay-graphic items on the media content at the client device 102. The operations may be executed by various operational components of the client device 102 in conjunction with a graphical processing unit (GPU) or a graphical-computation circuitry in the client device 102. Example of the operations may include, but are not limited to, media decryption, graphics overlay, media generation, media decoding, secure authentication, content recognition, graphics overlay verification, user-notifications. In accordance with an embodiment, the client device 102 may facilitate presentation of the overlay-graphic items on the media content through peripheral display devices, for example, televisions and standalone display screens. For such configurations, the client device 102 may be a media player device without a display screen, for example, Amazon Fire TV, Apple TV, Android TV, and Amazon Fire Stick. In other embodiments, the client device 102 may be integrated with the display device. Examples of the client device 102 may include, but are not limited to, a Set-Top-Box (STB), an IPTV, a hybrid box, a cable converter, a smartphone, a laptop, and a tablet, a smart TV, an internet TV, a portable console-based media player.

The client device 102 may be associated with a device identifier that may be a unique identifier for the user 114 associated with client device 102. Such device identifier may be used by the media presentation and distribution system 108 to discretely personalize delivery of the media content and the overlay-graphic items at the client device 102. Examples of such device identifier may include, but are not limited to, an International Mobile Equipment Identity (IMEI) number, Android ID, Apple ID, Advertising Identifier (IDFA), Advertising Identifier (AID), Unique Device Identifier (UDID), mobile number, and MacID. An electronic program guide (EPG) may be enabled on the client device 102 to facilitate the user 114 to switch to different media content in accordance with a specified user-preference. The client device 102 may receive the media stream of the media content and the overlay-graphic items, via a distribution channel, for example, an internet-based television network.

The graphics engine 102A of the client device 102 may comprise suitable logic, circuitry, and interfaces that may be configured to overlay the overlay-graphic items at relevant candidate time-periods within the media content. The graphics engine 102A may further ensure that each overlay-graphic item is overlaid and presented at the client device 102 with a presentation attribute that is specified for the overlay-graphic item. In accordance with an embodiment, the graphics engine 102A may be implemented as a specialized circuitry or an application in the client device 102. For such implementations, the graphics engine 102A may utilize computational-resources of a graphical processing unit (GPU) of the client device 102. The graphics engine 102A may be configured to execute various graphical operations associated with overlaying of the graphic-items on media content and presentation of the overlay-graphic items on the media content. Such graphical operations may further correspond to image-processing operations on the overlay-graphic items prior to overlaying on the media content.

Examples of the graphical operations may include, but are not limited to, graphic-scaling, graphic-rasterization, image-equalization in accordance with a visual quality of the progressively streamed media content, alpha compositing of the overlay-graphic items over the media content to modify the media content to display the overlay-graphic items as a transparent layer, on the media content as a background.

It may be noted that graphics engine 102A has been shown to be integrated with the client device 102 in FIG. 1. However, the graphics engine 102A may be implemented on a cloud server or a remote application server to execute the aforementioned operations on the cloud or the remote server while the graphics engine 102A is communicatively coupled to the client device 102, without a deviation from the scope of the disclosure.

The CDN 104 may comprise suitable logic, circuitry, and interfaces that may be configured to store one or more segments of the media content and distribute the stored one or more segments of the media content through the media presentation and distribution system 108. Accordingly, the CDN 104 may be configured to facilitate delivery of one or more programs as the media content to a plurality of users, such as the user 114. The CDN 104 may serve as a distributed network of media servers, which may serve as a curated repository of programs (encoded or uncompressed). The CDN 104 may be configured to distribute the one or more segments of the media content, via one or more media access platforms (such as broadcast, live and IP-based platforms) through the media presentation and distribution system 108. The one or more media access platforms may include a Video-On-Demand (VOD) platform that may be distributed via at least an over-the-air content delivery/distribution network, a linear content delivery/distribution network, a cable content delivery/distribution network, a satellite content delivery/distribution network, an Internet Protocol (IP) based content delivery/distribution network, and/or the like.

The CDN 104 may further manage resources for a delivery channel, which may be associated with one of a channel-frequency band or an internet protocol address (IP address). Examples of the delivery channel may include, but are not limited to, a television channel, a radio channel, a webcasting channel, a social webcasting, and an IP-based channel that may be hosted on a webpage or an application on a mobile device. The CDN 104 may comprise a distributed and networked chain of one or more media servers, media packagers, graphic item managers, media ingesters, encoder/decoders, processing engines, schedulers, and subscription management and payment systems.

The CDN 104 may include a VOD content store. The VOD content store may be configured to store and distribute the one or more programs as a VOD media stream to the client device 102 through the media presentation and distribution system 108. Such VOD media stream may comprise on-demand media content that may be personalized for the user 114, for example, movies, music videos, and clips of various shows or programs requested by the user 114. The VOD content store may be communicatively coupled with the CDN 104 to listen to requests from the media presentation and distribution system 108. Accordingly, the VOD content store may provide the one or more segments of the one or more programs in accordance with personalized playlists for the user 114.

The VOD content store may include VOD media data, which may be associated with a storage standard, for the one or more programs. The storage standard may be defined by a specified format, for example ISO/IEC 13818-1 (MPEG-2). A closed caption data and one or more inbound triggers for the one or more programs may be further stored in the VOD content store. The one or more programs may be associated with VOD program data that may comprise a VOD media content identifier, a title of the VOD media content, a summary of the VOD media content, a file format, encryption information, length, date and/or time of addition to a catalogue, a new content indicator for the one or more programs (e.g., a new VOD media that became available within the last 24 hours, last few days, last week, and/or the like), and a media content class. Examples of the media content class may include, but are not limited to, a television show, a cartoon program, a movie, a news media, an episode, a game, a clip, a recorded sports event, and an interactive media.

The graphic-items server 106 may comprise suitable logic, circuitry, and interfaces that may be configured to store the overlay-graphic items, such as overlay-graphic items of advertisements, channel logos, ad-bugs, channel-bugs, and promos. The graphic-items server 106 may further provide the stored overlay-graphic items to the media presentation and distribution system 108, and more specifically to a media packager or an item store within the media presentation and distribution system 108. The graphic-items server 106 may also store an attribute database of the overlay-graphic items. The attribute database for each of the overlay-graphic items may comprise an identifier, a playback start time, a playback end time, a graphic item format, a file size, a resolution, a codec, an on-screen position to overlay a graphic item (such as x,y coordinates), and the like. The graphic-items server 106 may be part of a graphic items storage network that may be associated with one or more promoters, such as advertisers, or graphic item owners. A repository of the overlay-graphic items may be managed by the graphic-items server 106. In such management, each overlay-graphic item may correspond to promotional content for an offering, such as a product offering or a service offering.

The media presentation and distribution system 108 may comprise suitable, logic, circuitry, and interfaces that may be configured to manage operations related to a instructions and decisioning for the presentation of the overlay-graphic items over the media content, as requested by the user 114. The media presentation and distribution system 108 may process each request with one or more user-attributes from the client device 102, and deliver the media content that matches the one or more user-attributes to the client device 102. Example of the user-attributes may include, but are not limited to, user preferences, age range, location, gender, and specific demographic factors. The media presentation and distribution system 108 may provide the media content as a media stream to the client device 102, via a distribution service. The distribution service may be at least one of a unicast, multicast, broadcast, or simulcast service. An encoder at the media presentation and distribution system 108 may encode the media stream using an adaptive bitrate streaming (ABR) technique in accordance with an availability of network bandwidth for the client device 102. Examples of the ABR technique may include, but are not limited to, HTTP Dynamic Streaming (HDS), Dynamic Adaptive Streaming Over HTTP (DASH), "Smooth", "Progressive" and "HTTP Live Streaming" (HLS) streaming techniques, and/or other digital streaming protocols. The operations of the media presentation and distribution system 108 may be shared with the CDN 104 of the network environment 100, without deviation from the scope of the present disclosure.

The one or more delivery devices 110 may comprise suitable logic, circuitry, and interfaces that may be configured to receive and serve one or more notifications or promotional content, via one or more delivery platforms, accessible on the one or more delivery devices 110. The one or more delivery platforms may correspond to a communication exchange platform that may incorporate visual, audible, or executable data to provide one or more notifications or associated promotional content to the user 114. Examples of the one or more delivery platforms may include, but are not limited to, an e-mail, a mobile messaging, a webpage, a podcast, and a push notification. Examples of the one or more delivery device may include, but are not limited to, mobile phones, laptops, desktops, tablets, and smart watches.

The communication network 112 may comprise suitable logic, circuitry, and interfaces that may be configured to provide a plurality of network ports and a plurality of communication channels for transmission and reception of the communication data. The communication data may correspond to data received and/or exchanged, via the communication network 112, among the media presentation and distribution system 108, the CDN 104, the graphic-items server 106, and the client device 102. Each network port may correspond to a virtual address (or a physical machine address) for transmission and reception of the communication data. For example, the virtual address may be an Internet Protocol version 4 (IPV4) or an Internet Protocol version 6 (IPV6) address, and the physical address may be a media access control (MAC) address. An application layer may be associated with the communication network 112 for implementation of communication protocols on one or more communication requests from at least one of the one or more computing devices. The communication data may be transmitted or received via a communication protocol. Examples of the communication protocol may include, but are not limited to, a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT).

The communication data may be transmitted or received via one or more communication channels of the plurality of communication channels. The communication channels may include, but are not limited to, a wireless channel, a wired channel, a combination of wireless and wired channel thereof. The wireless or wired channel may be associated with a data standard which may be defined by one of a Satellite Network, a Local Area Network (LAN), a Personal Area Network (PAN), a Wireless Local Area Network (WLAN), a Wireless Sensor Network (WSN), a Wireless Area Network (WAN), and a Wireless Wide Area Network (WWAN). Additionally, the wired channel may be selected on the basis of bandwidth criteria. For example, an optical fiber channel may be used for a high bandwidth communication, and a coaxial cable (or Ethernet-based communication channel) may be used for moderate bandwidth communication. In one scenario, the communication network 114 may be an internet based network. For such networks, a broadcast standard may be used, for example, National Television System Committee (NTSC), (Phase Alternating Line) PAL, Sequential Color with Memory (SECAM), Moving Picture Experts Group (MPEG), and (Digital Video Broadcasting) DVB-S/DVB-S2 or (Integrated Services Digital Broadcasting) ISDB-S.

Although, only a single communication network has been illustrated in FIG. 1, there may be more than one communication networks that may or may not share resources to optimally deliver programming content and other non-programming content to various connected client devices.

In operation, the user 114 may transmit a request, via a control mechanism of the client device 102, to a media presentation and distribution system 108 for playback of media content. The media content may be a programming media content, non-programming media content, or combination thereof. The request may be associated with one or more user-attributes for the media content. Example of the user-attributes may include, but are not limited to, user preferences, age range, location, gender, and specific demographic factors. Such request may correspond to personalization of the media content, for example, VOD media content. The request may be received by the media presentation and distribution system 108, via the communication network 112. In accordance with an embodiment, the request to present the media content may be transmitted to an application server (not shown) associated with the client device 102. Such application server may further transmit the request to the media presentation and distribution system 108, via the communication network 112. The client device 102 may include an application engine (not shown), which may be used to request for presentation of the media content from the media presentation and distribution system 108. The request may correspond to an HTTP-based request via a transfer protocol, for example, HLS for an internet-based media distribution channel.

The media presentation and distribution system 108 may authenticate the request from the client device 102 and may store the requested one or more user-attributes for the media content. The media presentation and distribution system 108 may be configured to search for an available one or more programs in accordance with the one or more user-attributes to deliver the media content to the client device 102. For example, a user, "Phil" may request the media presentation and distribution system 108 to present the media content associated with "Comedy" and "Thriller" genre. A search for one or more programs that may have "Comedy" or "Thriller" genre may be performed and the available comedy programs or thriller programs may be selected for delivery by the media presentation and distribution system 108.

Based on the search for the available one or more programs, the media presentation and distribution system 108 may generate a personalized playlist of the one or more programs. The personalized playlist may be used to schedule a playout of the media content at the client device 102. Such playlist may be personalized for the provided one or more preferences of the user 114. The media presentation and distribution system 108 may schedule a playout of each program within the personalized playlist. During such scheduling, the media presentation and distribution system 108 may retrieve the media content from the CDN 104 of one or more media networks, based on programs specified in the generated playlist. The retrieved media content comprises the scheduled one or more programs, which may include encoded or raw uncompressed programs. Such raw uncompressed programs may be encoded by the media presentation and distribution system 108 in accordance with a distribution or delivery protocol for the client device 102. Additionally, rights, such as digital rights, for the retrieved one or more programs may be applied to package the retrieved one or more programs as the media content. The media presentation and distribution system 108 may be configured to instruct a tagging service to insert one or more tags at one or more candidate time-periods determined within the media content of the one or more programs, such as TV programs, On-demand programs, movies, or other televised or subscription-based shows. Alternatively, the media presentation and distribution system 108 may enable the tagging service to insert a plurality of tags at a plurality of candidate time-periods within the media content. Hereinafter, the plurality of candidate time-periods may be interchangeably used as candidate time-periods.

The media presentation and distribution system 108 may be further configured to instruct a media analysis service to determine candidate time-periods within the scheduled media content. The determined candidate time-periods within the scheduled media content may refer to a specified opportunity within the media content. More specifically, each candidate time-period may be a time-period of an opportunity to display the overlay-graphic items on the media content. Examples of the candidate time-periods may include, but are not limited to, credit periods, start credits, end credits, lull points, time-based marked regions, location-based marked regions, context-based marked regions, explicit scene start and end, and product placement opportunities. The candidate time-periods may additionally specify an overlay-start time and an overlay-end time for the determined candidate time-period, for example, a candidate time-period of "2 minutes" may additionally specify an overlay-start time of "00:10:23" and an overlay-end time of "00:12:23" within the entire duration of the media content.

For each of the determined candidate time-periods within the media content, metadata may be stored within the media presentation and distribution system 108 and transferred to the tagging service of the media presentation and distribution system 108. The media presentation and distribution system 108 may invoke the tagging service to generate and insert the one or more tags, which include information of the candidate time-periods and associated metadata, at the determined candidate time-periods within the media content. Such generation and insertion may be based on the received metadata for each of the one or more determined event opportunity points within the media content. Each tag of the one or more tags may comprise, but is not limited to, at least a pointer for a defined interest duration of a corresponding event opportunity point, a modification in a display view for the defined interest duration, and a descriptor or pointer to a corresponding overlay-graphic item to be presented at a candidate time-period.

Based on the generated playlist, the scheduled one or more programs may be packaged with the one or more tags at the determined candidate time-periods, to obtain packaged media content. The packaged media content may be encapsulated on a transport media stream, such as an MPEG-2 stream, which may be referred to as a media stream of the media content. Additionally, the media presentation and distribution system 108 may generate one or more segments of the media stream prior to a playout of the media stream to the client device 102. Metadata of the one or more segments of the media stream and the one or more tags may be stored in a client manifest within the media presentation and distribution system 108. The transport media stream, as the media stream of the media content, and the client manifest may be transmitted to the client device 102.

The client device 102 may be configured to receive the media stream of the media content, via the communication network 112. The received media stream comprises media content associated with the one or more tags. The received media stream may be encoded and encrypted with a defined encoding technique or encryption technique prior to the reception at the client device 102. The client device 102 may further request the media presentation and distribution system 108 to transmit the overlay-graphic items, via the communication network 112. In accordance with an embodiment, based on the request, the media presentation and distribution system 108 may retrieve the overlay-graphic items, such as overlay graphics of the promotional content, from the graphic-items server 106. In accordance with another embodiment, the media presentation and distribution system 108 may retrieve (or fetch) the overlay-graphic items from internally managed graphic stores.

In accordance with an embodiment, each overlay-graphic item may be a promotional advertisement overlay-graphic and a corresponding identifier may be an advertisement identifier (Ad-ID). In accordance with an embodiment, each overlay-graphic item may be the promotional content and a corresponding identifier may be a web, image or audio-based beacon that may be present with the overlay-graphic item.

The overlay-graphic items may be embedded with one or more identifiers and further packaged and encapsulated on a transport media stream, such as an MPEG-2 stream. Example of the one or more identifiers may include, but are not limited to, ID3 tags, executable beacons, audible beacons, inaudible beacons, secure public/private keys, and identifier frames. The overlay-graphic items may be transmitted with the media stream of the media content or with a client manifest associated with the media stream to the client device 102, via the communication network 112.

After the client device 102 receives the media stream and the overlay-graphic items, the GPU or a specialized computational circuitry of the client device 102 may be configured to decrypt and decode each frame of the media content within the media stream. After the media content within the media stream gets decoded at the client device 102, the one or more tags within the media content may be identified by the client device 102. The identified one or more tags may correspond to a candidate time-period, which may be an overlay-duration of the overlay-graphic items. The one or more tags may correspond to a client manifest that may be created by the media presentation and distribution system 108 and transmitted to the client device 102. The client manifest may be interpreted at the client device 102. The one or more tags may be represented by at least one of a signal, a beacon, a SCTE-35 message, a marker, textual information, binary information, visual information, aural information in the first media stream, and the like. Each tag of the one or more tags may include, but is not limited to, at least a pointer for a defined playback duration of a corresponding event opportunity point, a modification in a display view the defined playback duration, and a descriptor or pointer to a corresponding non-programming media asset to be presented within the playback duration of the corresponding event opportunity point. Such candidate time-periods may further point to a specific event opportunity points within the media content. Each tag may further specify a presentation attribute that relates to responsive-features, presentation-behavior, display-region, and resolution, for the overlay-graphic items during presentation on the media content.

The client device 102 may be configured to transmit a request to the media presentation and distribution system 108 for selection of the candidate time-periods from the identified candidate time-periods in the media content. The media presentation and distribution system 108 may receive, from the client device 102, the one or more occurrences of the event points for the identified candidate time-periods within the media content, as identified by the client device 102. The media presentation and distribution system 108 may be configured to select the candidate time-periods from the received one or more occurrences of the identified candidate time-periods. Such selection may be based on contextually relevant points in the media content that maps to a context of the received overlay-graphic items. Such selection may further be based on user-attributes that may be associated with the identified candidate time-periods in the media content. In other scenarios, such selection may be factored based on promotional goals, ad-campaigns, flight parameters, sales/reach goals, and revenue-based goals.

The client device 102 may receive a response from the media presentation and distribution system 108 on each transmitted request for the selection of the candidate time-periods within the media content. The response may comprise the selected candidate time-periods for presentation of the overlay-graphic items on the media content. In some implementations, the response may further specify the presentation attributes, such as on-screen position of overlay-graphic item, graphic-resolution, transparency-feature, player-branding, transition effects, digital video effects (for example, squeeze back, hot start, etc.), personalized messages with the presented overlay-graphic item, and third-party purchase options. The presentation attributes may also include options for a squeeze-back of the programming media content to a defined region within the display view, an overlay over the defined region within the display view, and a partitioning of view of at the client device 102. Based on the response, the client device 102 may utilize resources of the GPU or the computational circuitry to graphically-render the identified overlay-graphic items for the selected candidate time-period over the media content. The rendering of the overlay-graphic items may correspond to an overlay of the overlay-graphic items on the media content. In other implementation, the overlay-graphic items may be encoded for playback at the determined candidate time-periods in the media content, for example, 10 minutes of a channel bug at the program start.

At the playback time, by use of the GPU or other computational circuitry, the client device 102 may be configured to present the overlay-graphic items at the selected candidate time-periods in the media content. The presentation of the overlay-graphic items may be executed concurrently with the media content, in accordance with the identified one or more presentation attributes for the overlay-graphic items. Such presentation of the overlay-graphic items advantageously personalizes a viewing experience of the user 114, and thereby increases user-retention or decreases an attrition rate for users from services of the network provider.

In accordance with an embodiment, the client device 102 may initiate a verification service at one of a client-side or a server-side. The client-side verification service may be initialized at a verification engine of the client device 102 and the server-side verification service may be initialized at the verification server of the media presentation and distribution system 108. The verification service may be utilized to verify whether the overlay-graphic items are presented in accordance with a presentation criteria for the client device 102 without deviations from the specified one or more presentation attributes for the overlay-graphic items. The verification may be based on at least one of a public/private key based verification, content recognition based verification, snapshot based server-side verification of the playback of the overlay-graphic items, and server-side virtual client based verification. The presentation criteria may include, but are not limited to, a specific presentation-time, a presentation-duration, a presentation-frequency, a specified slot within a specified program of the media content, a responsive behavior of the overlaid overlay-graphic items, and a specific resolution for the overlay-graphic items.

In accordance with an embodiment, the client device 102 may generate one or more notifications based on a defined set of rules specified for each of candidate time-periods within the media content. The defined set of rules for the generation of the one or more notifications may be factored on the basis of a user-defined constraint, a client-device constraint, a defined goal of impressions, program reach or views, or a defined time of generation of the one or more notifications, and the like. In other words, the defined set of rules may be based on constraints, for example, a cap or an upper limit on a number of notifications, a no-disturbance time period provided by the user 114, or a network-filter in the client device 102 that filters notifications, a sales or impressions goal of the promoters of the overlay-graphic items, and the like. The generated one or more notifications may be transmitted to at least the client device 102 or one or more delivery platforms associated with the client device 102. Such one or more delivery platforms may comprise emails, messages, webpages, podcasts and applications, which may be present in the one or more delivery devices 110 or the client device 102. The detailed description of the operation of the client device 102 and the media presentation and distribution system 108 has been described in detail in FIG. 2A and FIG. 2B, respectively.

Figure 2A:
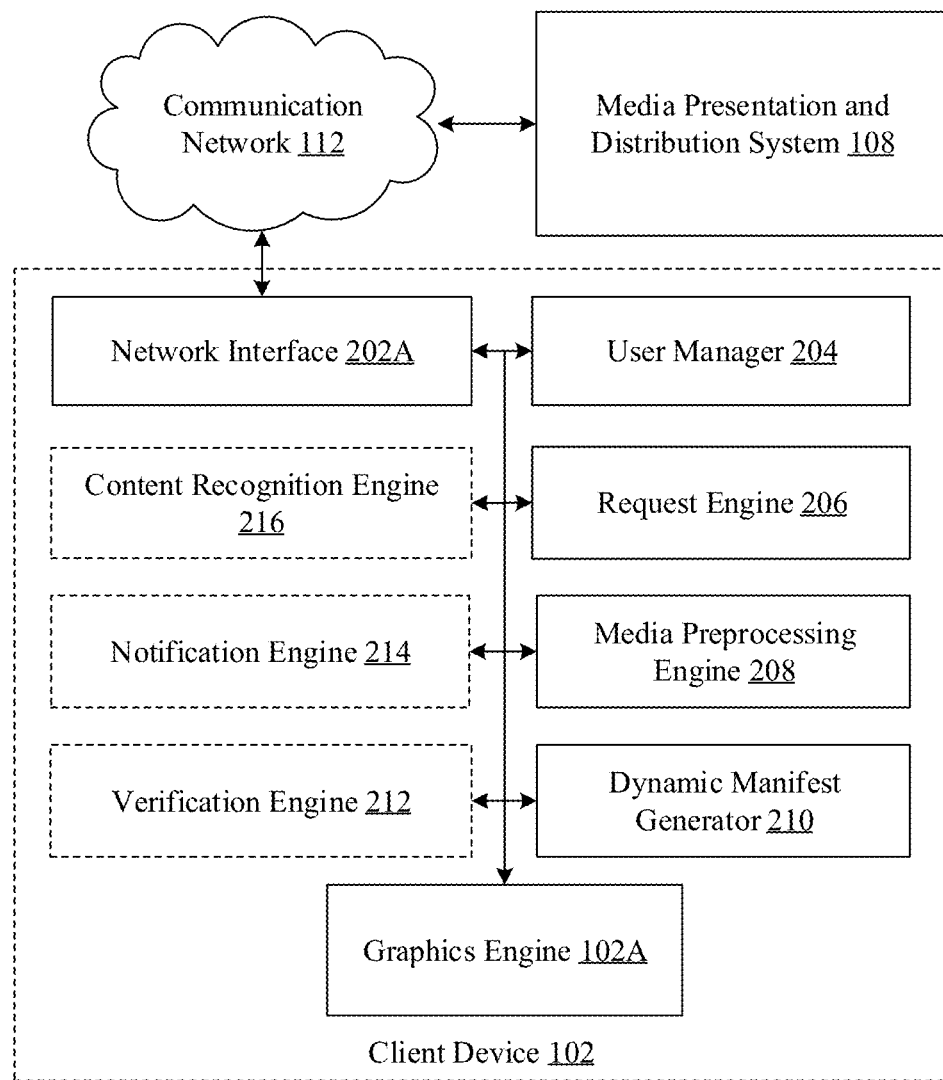
FIG. 2A is a block diagram that illustrates an exemplary client device for client-side presentation of overlay-graphic items on media content, in accordance with an embodiment of the present disclosure.

FIG. 2A is a block diagram that illustrates an exemplary client device for client-side presentation of overlay-graphic items on media content, in accordance with an embodiment of the present disclosure. FIG. 2A is explained in conjunction with elements of FIG. 1. With reference to FIG. 2A, there is shown the client device 102 that comprises a network interface 202A, a user manager 204, a request engine 206, and a media preprocessing engine 208, and the client-overlay engine 102A, and the dynamic manifest generator 210. Additionally, a verification engine 212, a notification engine 214, and a content-recognition (CR) engine 216 may be implemented in the client device 102. The various components of the client device 102 may be communicatively coupled with each other, via one or more buses or circuitry in the client device 102. The graphics engine 102A may be present as a resource of a GPU within the client device 102. The media presentation and distribution system 108 and the CDN 104 may be communicatively coupled, via the communication network 112, to the client device 102.

The network interface 202A may comprise suitable logic, circuitry, and interfaces that may be configured to communicate with various computing components within the client device 102. The network interface 202A may be implemented by use of known technologies to support wired or wireless communication of the various computing components of the client device 102 with peripheral components, such as the media presentation and distribution system 108 and the CDN 104. Components of the network interface 202A may include, but are not limited to, an antenna, a radio frequency (RF) transceiver, one or more amplifiers, a tuner, one or more oscillators, a digital signal processor, a coder-decoder (CODEC) chipset, and/or a local buffer circuitry. The network interface 202A may further be configured to operate as a communication bridge between various components of the client device 102, the CDN 104, the graphic-items server 106, the one or more delivery devices 110 associated with the user 114, and various computing components of the client device 102.

The user manager 204 may comprise suitable logic, circuitry, and interfaces that may be configured to manage processes and/or requests that may be associated with the one or more preferences, activities (or footprints), interaction, or profile of the user 114. Such preferences, activities, interaction, or profile may be stored and managed as user-related data in a user database. The user-related data may be stored as a structured and relational data, or an unstructured and non-relational data in the user database. Every time the user 114 requests to access the preferred media content, via the client device 102, the request may be stored at the user manager 204. The user manager 204 may be configured to authenticate the user 114 upon receiving such request, via the network interface 202A. Additionally, the user manager 204 may be configured to facilitate transactions or payments, in conjunction with a payment engine (not shown), for one or more product or service offerings, promoted via the overlay-graphic items.

The request engine 206 may comprise suitable logic, circuitry, and interfaces that may be configured to transmit one or more requests to the media presentation and distribution system 108. The request engine 206 may be further configured to receive responses for the transmitted requests and, permissions and/or rights over the media content. The request engine 206 may be communicatively coupled to the network interface 202A that may be further coupled to an I/O interface (not shown) of the client device 102.

The media preprocessing engine 208 may comprise suitable logic, circuitry, and interfaces that may be configured to receive a media stream of media content from the media presentation and distribution system 108, via the communication network 112. Operations of the media preprocessing engine 208 may include, but are not limited to, media storage, media decryption, media decoding/decompression, media caching, media-tag detection and media-tag analysis, and user-preference management. The media preprocessing engine 208 may pre-process the received media stream of the media content such that relevant candidate time-periods or interest durations and associated presentation attributes, suitable for presentation of overlay-graphic items on the media content, may be optimally identified at the client device 102. In accordance with an embodiment, the media preprocessing engine 208 may be implemented as a standalone circuitry in the client device 102 (as part of a hardware media codec). In other embodiments, the media preprocessing engine 208 may be implemented as a programmable application/program stored in a memory of the client device 102 (as part of programed media codec).

The dynamic manifest generator 210 at the client-side may provide functionalities of dynamic manifest manipulation and generation for customized presentation of programming media content at the client device 102. The programming media content schedule that is manipulated by the dynamic manifest generator 210 at the client device 102 may enable viewing at least one of, or a combination thereof, but not limited to, VOD media content, linear media content, live media content, VOD to VOD programming media content, VOD to live programming media content, live to live programming media content, and live to VOD programming media content. Such diverse types of programming media content schedule may be manipulated based on implementation of functions on dynamically modifiable manifest information generated at the dynamic manifest generator 210.

The verification engine 212 may comprise suitable logic, circuitry, and interfaces that may be configured to verify the presentation of the overlay-graphic items on the media content, at the client device 102. Such verification may be performed via at least a public/private key based authentication, content recognition of presented overlay-graphic items, server-side snapshot based verification, and virtual simulation of client display view. The verification engine 212 may utilize resources of the GPU/the graphics engine 102A of the client device 102, to verify the presentation of the overlay-graphic items. In accordance with an embodiment, the verification engine 212 may be implemented as a standalone circuitry in the client device 102. In other embodiments, the verification engine 212 may be implemented as a programmable applications stored in the memory of the client device 102.

The notification engine 214 may comprise suitable logic, circuitry, and interfaces that may be configured to generate, transmit, and receive responses over the one or more notifications, personalized for the one or more preferences of the user 114. Such one or more notifications may be generated as per specification of the associated one or more delivery platforms. For example, a first notification may be generated as per a specification of an e-mail delivery platform, and a second notification may be generated for a popup notification for a webpage. The second notification may be a push-notification that redirects to a user-interface of an application engine at the client device 102 or the one or more delivery devices 110. In accordance with an embodiment, the notification engine 214 may be implemented as a standalone circuitry in the client device 102. In other embodiments, the notification engine 214 may be implemented as an application stored in the memory of one of the client device 102 or a remote notification server associated with the client device 102.

The CR engine 216 may comprise suitable logic, circuitry, and interfaces that may be configured to determine overlay-information associated with the presentation of the overlay-graphic items on the media content, at the client device 102. The CR engine 216 may be further configured to identify whether the overlay-graphic items have been loaded and adaptively presented within the display view of the client device 102, based on the definitions of the one or more tags within the received media content. The CR engine 216 may be operationally attributed as a statistical signal/image processing engine that may process an audio stream or a video stream, which may be a segment of the media content embedded with the overlay-graphic items, as played at the client device 102. In accordance with an embodiment, the CR engine 216 may be implemented as a standalone circuitry associated with the GPU of the client device 102. In other embodiments, the CR engine 216 may be implemented as an application stored in the memory of one of the client device 102.

In operation, a request that includes the one or more preferences of the user 114 for the media content may be transmitted by the client device 102. Specifically, the client device 102 may utilize the request engine 206 to transmit the request to stream a media content based on the one or more preferences of the user 114. The request may be transmitted to the media presentation and distribution system 108 through the network interface 202A, via the communication network 112. The request to stream the media content at the client device 102 may be further associated with an authentication request for the user 114. The authentication of the user 114 with the media presentation and distribution system 108 may be managed by the user manager 204 of the client device 102. Authentication data of the user 114, which may comprise private keys or encrypted passwords, may be transmitted to the media presentation and distribution system 108 along with the request to stream the media content. A validation of the request from the request engine 206 may be performed by the media presentation and distribution system 108. Such validation may correspond to at least a new registration of the user 114 associated with the client device 102, a renewal of service subscription, a verification of payment, an authentication of the authentication data of the user 114 associated with the client device 102, and the like.

A display device associated with the client device 102 may be populated with a user interface of an application engine. The application engine may be a programmable application stored as instructions in the memory, which may be utilized to render a media presentation environment at the display device associated with the client device 102. The media presentation environment may be rendered by use of the application engine at the client device 102 in conjunction with the graphics engine 102A of the client device 102. Further, the media presentation environment may be an on-screen view of different graphics, media, or textual resources viewable at the user interface of the application engine, rendered at the display device associated with the client device 102.

The media presentation environment may comprise UI components, such as media players, navigational menus, user-interactive/responsive buttons, media recommendation, and media information panels. Such UI components may further comprise one or more graphical objects and one or more non-graphical objects. Initially, the application engine may be tasked with the enablement of the one or more non-graphical objects within the media presentation environment at the display device. The one or more non-graphical objects may comprises at least one of a markup for players, timers, logos, bugs, thumbnails, and the like. The markup may specify a position, a size and a scale, and an aspect-ratio of the one or more non-graphical objects within the displayed media presentation environment at the display device associated with the client device 102. Thereafter, the graphics engine 102A may be configured to render the one or more graphical objects over the top of the one or more non-graphical objects, such as player branding, animation, responsive objects, and buttons. The rendering of the one or more graphical objects may be personalized for the client device 102, as per the one or more user-attributes and/or specified by content provider or an advertiser. Thus, the application engine, in conjunction with the graphics engine 210, may be configured to render the customized media presentation environment at the display device associated with the client device 102.

Based on the request received from the client device 102, the media presentation and distribution system 108 may be configured to transmit a media stream of the preference-based media content to the client device 102, via the communication network 112. The media preprocessing engine 208 of client device 102 may receive the media stream of the preferred media content, via the network interface 202A, which may comprise dedicated network ports for streaming such media stream. The media stream may be received through one of a hypertext transport protocol (HTTP) Live Streaming (HLS) format, Microsoft smooth streaming, Dynamic Adaptive Streaming over HTTP (DASH), Protected HTTP Dynamic Streaming (PHDS), Protected HTTP Live Streaming (PHLS), or real time messaging protocol (RTMP), other digital streaming protocols and the like. The client device 102 may comprise one or more memory devices, which may comprise one or more memory blocks, reserved for caching of the communication data received, via the communication network 112. In one such case, the media stream may be cached in the one or more memory blocks of the one or more memory devices of the client device 102. The media presentation and distribution system 108 may also transmit a client manifest, along with the media stream, to the client device 102.

The one or more memory devices of the client device 102 may be further configured to receive and store the overlay-graphic items, such as overlay graphics of logos, bugs, advertisements, watermarks, banners, and or popups. Each of the overlay-graphic items may be embedded with the one or more identifiers, such as beacons, public/private keys, ID3 tags, and audio or video watermarks. The overlay-graphic items and the embedded one or more identifiers may be cached and stored at the one or more memory devices of the client device 102.

The cached media stream may be encrypted with a defined encryption technique to prevent unauthorized access of the media content within the media stream. The media content within the media stream may be stored as one or more encrypted blocks of the media content in the one or more memory blocks of the one or more memory devices of the client device 102. Video content of the media content may be stored as one or more encrypted video blocks and audio content of the media content may be stored as one or more encrypted audio blocks within the one or more memory blocks. Each encrypted audio or video block may comprise an integer number of blocks, for example 16-byte blocks, which may be encrypted using the defined encryption technique, such as AES-128 cipher block chaining (CBC) mode with no padding.

After the media stream is cached, the media preprocessing engine 208 may decrypt the encrypted one or more audio blocks and the encrypted one or more video blocks of the media content within the cached media stream, stored at the one or more memory blocks in the client device 102. The decryption of the media content within the cached media stream may be performed, in conjunction with the application engine or the user manager 204 within the client device 102. The media preprocessing engine 208 may be further configured to decode the decrypted blocks (or frames) of the audio content or the video content within the media content based on a defined codec engine (not shown), which may be present within the media preprocessing engine 208 or may be accessible via one or more application programming interfaces (API) of a third party network. Examples of the defined codec engine for the audio content or the video content may include, but are not limited, H.265/MPEG-H HEVC, H.264/MPEG-4 AVC, H.263/MPEG-4 Part 2, H.262/MPEG-2, Microsoft codecs, Google (On2), and specifically, x264, HEVC, Xvid, FFmpeg, Divx, Windows Media Encoder, VP version[3-9], FFays, and x265. Such defined codec engine may be hardware-accelerated or may be programmatically accelerated by the graphics engine 210 of the client device 102. Each of the one or more decoded blocks of the media content may be presented within an allocated region of a rendered display view, at the display device associated with the client device 102.

The media preprocessing engine 208 may be further configured to manage resource allocation for decoding and of the media content, thread pool management for managing concurrent thread allocation for different operations, and regulation of the playback of the media content at the display view of the client device 102, in accordance with one or more playback specifications in the client manifest. Such playback specification may include, but may not be limited to, a frame rate, a saturation, a brightness, a contrast, an aspect ratio, and a resolution of the media content.

The programming media content within the cached first media stream may be played at the client device for a defined playback duration, as per the playlist of the one or more programs within the programming media content. The playlist of the one or more programs may be dynamically modified by the dynamic manifest generator 208A. For example, the playlist may be modified to present the one or more programs as at least one of, or a combination of, but not limited to, a linear playlist of programs, a live playlist of programs, a non-linear (or VOD) playlist of programs, a live to live, a VOD to VOD, a linear to VOD, a non-linear to linear playlist of programs. Such media content may correspond to a personalized playlist of the one or more media programs in accordance with the transmitted one or more user-attributes. After the media preprocessing engine 208 decodes the received media content, one or more tags inserted within the media content may be identified by the media preprocessing engine 208 within the media content. The identification of the one or more tags may be from the client manifest received from the media presentation and distribution system 108.

The media preprocessing engine 208 may be further configured to identify candidate time-periods within the decoded media content of the received media stream. The candidate time-periods may be identified based on the identified one or more tags within the media content. Alternatively stated, each tag within the media content may correspond to at least one time duration for a presentation of the overlay-graphic items over the media content. Each of such candidate time-periods may correspond to a specified event, which may correspond to at least a credit period, a lull period within the media content, a contextually similar time duration, and an ad duration within the media content. Each tag and associated metadata may further specify a descriptor for a corresponding overlay-graphic item that is supposed to be presented at the identified candidate time-period of the media content.

In one example, a tag ($T_1$) may specify a candidate time-period of "00:25:33" (hh:mm:ss) to "00:40:33", i.e. a duration of "15 minutes" of playback of an overlay graphic, such as a "TNT" channel bug, at a bottom right corner of the media content. In another example, a tag ($T_2$) may specify another candidate time-period of "01:22:23" to "01:32:23", i.e. a duration of "10 minutes" for playback of an overlay-graphic, such as "BeverageX" bug, at a bottom left corner of the screen during a lull period in a baseball match.

The media preprocessing engine 208 may be further configured to identify one or more presentation attributes for the overlay-graphic items based on the identified one or more tags within the media content. Each of the one or more presentation attributes may specify a behavior, an interactivity, a responsive-feature, a graphic-resolution, a position within a displayed view of the media content, animation effects, or specific personalized texts/options for the user 114. Such one or more attributes may be personalized based on at least one of stored user-attributes, user-location, demographic factors associated with the user, income-related factors, promotional goal-related factors, and the like.

With reference to aforementioned examples, presentation attributes associated with the tag ($T_1$) may specify a resolution of "300 pixels×300 pixels" for the "TNT bug" at the bottom right corner of the media content for the specified time. Additionally, the tag ($T_1$) may specify that the overlay-graphic may be activated as an interactive graphic, which may behave as a user-selectable button in addition to an infographic bug. Similarly, presentation attributes associated with the tag ($T_2$) may specify a resolution of "300 pixels× 400 pixels" for the "BeverageX bug" for the specified time. Additionally, the tag ($T_2$) may specify that the overlay-graphic may be presented as an animated graphic, which may slide from left to right of the displayed view of the media content during the lull period.

The overlay-graphic items may be further received at the client device 102 from the media presentation and distribution system 108. Such overlay-graphic items may be transmitted along with the client manifest for the media content, at a time. The overlay-graphic items may be received in accordance with measured and/or estimated preferences and/or user-attributes, a context of the one or more segments of the media content, or a demographic criteria (for example, age, gender and region). Records of the overlay-graphic items to be presented at the client device 102 may be managed for linear pre-scheduled media streams as well as the VOD media streams.

With identification of the overlay-graphic items that are described in the one or more tags, the graphics engine 102A may be configured to request a decision server (or an Event Signaling and Management (ESAM) server) of the media presentation and distribution system 108, to select candidate time-periods from the identified occurrences of the candidate time-periods within the received media content. The operations associated with the selections of the candidate time-periods from the identified occurrences of the candidate time-periods has been described in FIG. 2B. Post selection from the media presentation and distribution system 108, the graphics engine 102A may be configured to overlay the received overlay-graphic items at the selected candidate time-periods in accordance with the specified one or more presentation attributes for the selected candidate time-periods in the media content.

The graphics engine 102A may be further configured to overlay the overlay-graphic items such that graphic-overlaid media content may be presented as a multi-layered media content, which comprises of layers of graphics over the actual media content. In certain cases, multiple overlay-graphic items may be specified for the presentation within a specific candidate time-period in the media content. Such multiple overlay-graphic items may be presented as stacked layers of graphic items over frames of the media content, for a selected candidate time-period. In certain embodiments, one of the non-programing overlay-graphic items may be a specified routine/code stored in the memory, to be utilized to render such overlay-graphic items for certain candidate time-periods in the media content.

The graphics engine 102A may be further configured to present the overlay-graphic items at the identified candidate time-periods during playback of the media content in the media presentation environment that is rendered at the display device associated with the client device 102. The presentation of the overlay-graphic items may be based on the identified one or more presentation attributes. The overlay-graphic items may be concurrently presented with the media content with a visual quality, which may be agnostic of at least a first variation in a bandwidth of the communication network 112 and a second variation in a visual quality of the associated media content.

The first variation in the bandwidth of the communication network 112 may be associated with a relative availability of download/upload data rates for the communication network 112, which may further be reciprocated to the second variation of the visual quality of the media content. Such second variation in the visual quality of the media content may be associated with a factor that specifies that the media stream may be presented via an adaptive bitrate streaming technique in accordance with the first variation in the bandwidth of the network. The visual quality may correspond to at least an image quality or a video frame quality that may be associated with, for example, a sharpness, a noise, a contrast, a color accuracy, a distortion, and/or one or more visual artifact attributes.

Such presentation of the media content along with the overlay-graphic items may advantageously increase a likelihood of an engagement of the user 114 associated with the client device 102. The likelihood of engagement may be improved based on a targeted selection of the candidate time-periods for presentation of the overlay-graphic items and therefore, improve an attention span of the user 114.

In accordance with an embodiment, the personalized presentation of the media content with the overlay-graphic items may further require a concrete verification at either the client-side (that is the client device 102) or at the server-side (that is the media presentation and distribution system 108). Therefore, the verification engine 212, in conjunction with one of the CR engine 216 or the graphics engine 210, may be configured to verify the presentation of the overlay-graphic items at the selected candidate time-periods. Such client-side verification may be based on one or more techniques, which may be used to identify one or more deviations with the playback of the overlay-graphic items over the media content at the display view of the client device 102. Example of the one or more deviations may include, but are not limited to, a partial overlay, a color imbalance, an error with transition or overlay, an abrupt disappearance of the overlay-graphic items or the media content, and a non-responsive presentation of the overlay-graphic items. The one or more deviations may be identified with respect to defined item delivery criteria. The defined item delivery criteria may comprise a verification of at least a display time, a display duration, a display frequency, a specified slot within a specified program of the media content, a number of interactions with the presented overlay-graphic item, an enablement of one or more features at the playback time of the associated overlay-graphic item, a responsive display of the associated overlay-graphic item for one or more user-interactions, and a modification in the display view for the associated overlay-graphic item.

The verification engine 212 may verify the presentation of the overlay-graphic items based on detection and further processing of one or more identifiers, such as audio beacons, image beacons, watermarks, and Nielsen ID3 tags, which may be embedded with the presented media content or the overlay-graphic items.

In accordance with an embodiment, the notification engine 214 in the client device 102 may be configured to generate and serve one or more notifications, via one or more delivery platforms or one or more delivery devices 110 associated with the user 114. The one or more notifications may be generated, based on a defined set of rules, specified for the selected candidate time-periods within the media content. Such one or more notifications may be intended to inform the user 114 about a presented overlay-graphic item, utilized to present an overlay-graphic item, an engagement of the user 114 with the presented overlay-graphic item, a promotional offer on a promoted offering for presented overlay-graphic item, and the like. The defined set of rules for generation of the one or more notifications may comprise a user-defined constraint, a client-device constraint, a defined goal of impressions, reach or views, a defined time of generation of the one or more notifications, and a specified type of the one or more notifications, for example, push, pop-up, fixed, and interactive notifications. Additionally, each of the one or more notifications may provide one or more selectable options for the user 114 to provide a request for one or more services. Such service may correspond to an engagement of the user 114 with the offering presented in the corresponding overlay-graphic item.

The notification engine 214 may be further configured to receive a request based on a response from the user 114 over the served one or more notifications. Example of the one or more services may include, but are not limited to, subscriptions, payments, registrations, upgrades, updates, purchases, transactions, sign up or sign in, for one or more products, service or event offering, promoted by the presented overlay-graphic items on the media content. Additionally, the notification engine 214 may be configured to instruct the presentation or the one or more presentation attributes for the overlay-graphic items based on the received request on the served one or more notifications.

It may be noted that the present disclosure has been described for engagement of a single user with the client device 102. However, the present disclosure may be applicable for a plurality of users, each of which may engage with one or more client device 102s, without a deviation from the scope of the disclosure. Such engagement of the plurality of users may be concurrent, sequential or at random. The media presentation and distribution system 108 may optimally balance the requirements and perform management of a corresponding plurality of requests from the plurality of users in real-time.

Figure 2B:
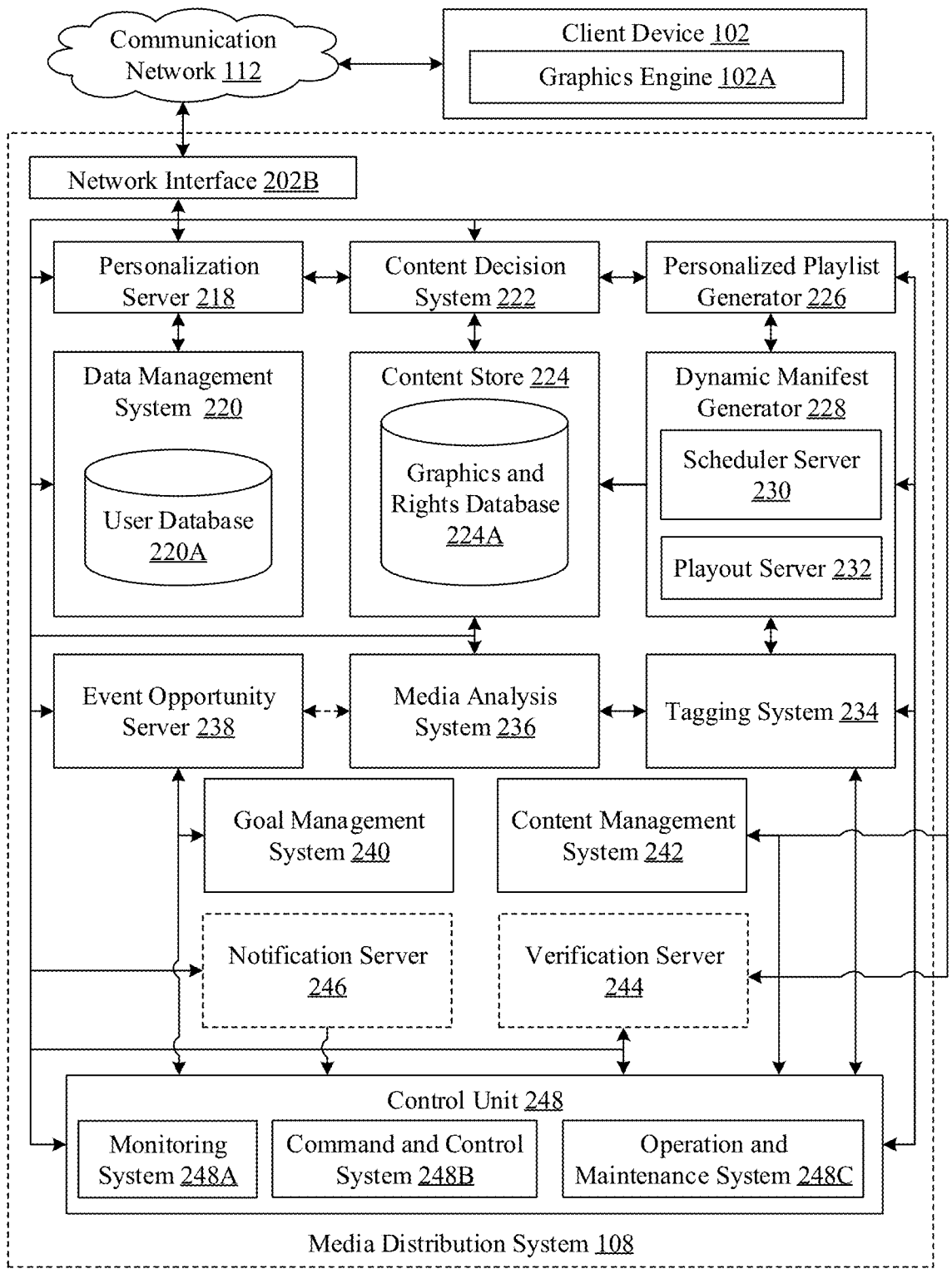
FIG. 2B is a block diagram that illustrates an exemplary media presentation and distribution system at server-side to instruct presentation of overlay-graphic items on media content at client-side, in accordance with an embodiment of the present disclosure.

FIG. 2B is a block diagram that illustrates an exemplary media presentation and distribution system at a server-side to instruct client-side presentation of overlay-graphic items on media content, in accordance with an embodiment of the present disclosure. FIG. 2B is explained in conjunction with elements of FIG. 1 and FIG. 2A. With reference to FIG. 2B, there is shown the media presentation and distribution system 108 that comprises a network interface 202B, a personalization server (PS) 218, a data management system (DMS) 220, a user database 220A, a content decision system (CDS) 222, a content store (CS) 224, a graphics and rights database 224A, a personalized playlist generator (PPG) 226, a dynamic manifest generator 228, a scheduler server (SS) 230 and a playout server (PLS) 232. There is also shown a tagging system (TS) 234, a media analysis server (MAS) 236, an event opportunity server (EOS) 238, a goal management system (GMS) 240, a content management system (CMS) 242, a verification server (VS) 244, a notification server (NS) 246, and a control unit (CU) 248, communicatively coupled with each other in the media presentation and distribution system 108.

The network interface 202B may comprise suitable logic, circuitry, and interfaces that may be configured to operate as a communication bridge between various components of the client device 102, the CDN 104, the graphic-items server 106, and the one or more delivery devices 110 associated with the user 114 and various computing components of the media presentation and distribution system 108. The network interface 202B may be implemented by use of known technologies to support wired or wireless communication of the various computing components of the media presentation and distribution system 108 with peripheral components, such as the client device 102, the CDN 104, the graphic-items server 106, and the one or more delivery devices 110 associated with the user 114. Additionally, the network interface 202B may operate as a switch or a router of communication signals to dedicated components of the media presentation and distribution system 108. Components of the network interface 202B may include, but are not limited to, an antenna, an RF transceiver, one or more amplifiers, a tuner, one or more oscillators, a digital signal processor, a CODEC chipset, and/or a local buffer.

The PS 218 may comprise suitable logic, circuitry and interfaces that may be configured to operate as a communication interface between the (client-side) client device 102 and the (server-side) DMS 220. The PS 218 may be specifically configured to communicate, via the network interface 202B, with the client device 102 associated with the user 114, using communication signals. The one or more requests, from the client device 102, may be received at the network interface 202B. The network interface 202B may be configured to route the received one or more requests to the PS 218. The PS 218 may be configured to parse one or more request parameters in each received request from the client device 102, and communicate the parsed one or more request parameters with the DMS 220 to form semantic relationship models among at least one of preferences, profile, likes, dislikes, location or demographic factors associated with the user 114 associated with the client device 102. The semantic relationship models may be statistical models of the one or more user-attributes associated with the client device 102 and may provide a better understanding of the user-behavior, preferences, attention, intent, and interest for requested one or more preferences of the media content. The PS 218 may be further associated with the CDS 222 and may communicate the parsed one or more request parameters to the CDS 222.

The DMS 220 may comprise suitable logic, circuitry and interfaces that may be configured to store, collate, and assimilate data, form relationships within stored data of the user 114. The DMS 220 may specifically form a data cloud for the one or more user-attributes, likes, dislikes for the media content and the overlay-graphic items, demography, financial information, location, and the like. The DMS 220 may be further configured to generate deep or shallow semantic relationship models of the stored and assimilated data for the user 114. For example, for a user (B), the DMS 220 may identify that the user (B) may have a preference for "sports", a liking for "NFL", a liking for the team "Atlanta Falcons", and for a specific player "X" within the team of "Atlanta Falcons". Additionally, the DMS 220 may identify that the user (B) has a disliking for "Detroit Lions", and therefore, the DMS 220 may form a deep semantic relationship model (M1) that may ascertain that the user (B) may be served with overlay-graphic items, such as logos, bugs or banner ad, which may be associated with the player "X" and "Atlanta Falcons" and not associated with the "Detroit Lions" or associated team member of "Detroit Lions". Accordingly, the DMS 220 further update the deep semantic relationship models of one or more features, for examples, a deep relationship of "100" features of the user (B). The data associated with the user 114 may be shared by the DMS 220 in response to requests from each component of the media presentation and distribution system 108.

The DMS 220 may comprise at least the user database 220A. The user database 220A may comprise suitable logic, circuitry and interfaces that may be configured to store and update records for the one or more preferences, likes, dislikes, demography, location, income or related data of the user 114 associated with the client device 102.

The CDS 222 may comprise suitable logic, circuitry and interfaces that may be configured to identify, from a curated repository of programs in the CS 224, an available one or more programs that may match the one or more request parameters from the client device 102 associated with the user 114. The CDS 222 may further perform ranking of the identified one or more programs for the user 114, sorting of the identified one or more programs for the user 114, and selection of the one or more programs from the sorted and ranked one or more programs. After selection, the CDS 222 may be configured to obtain or negotiate content rights, permissions, or certificates for the selected one or more programs for playout to the client device 102, associated with the user 114. The CDS 222 may be communicatively coupled with the PPG 226, and further configured to transmit the selection for the one or more programs to the PPG 226.

The CS 224 may comprise suitable circuit, interface, may comprise suitable logic, circuitry and interfaces that may be configured to store and manage an inventory of the overlay-graphic items and a curated repository of programs, associated rights, certificates or licenses for the overlay-graphic items, and the curated repository of programs. The CS 224 may comprise at least the graphics and rights database 224A.

The graphics and rights database 224A may comprise suitable logic, circuitry and interfaces that may be configured to store the overlay-graphic items, and associated metadata and rights. Such associated metadata and rights may be invoked or validated at the presentation time of the overlay-graphic items.

The PPG 226 may comprise suitable logic, circuitry and interfaces that may be configured to generate a personalized playlist of the selected one or more programs. The personalized playlist may correspond to a recommended sequence of one or more programs for the corresponding request parameters in the request, received at the PS 218 from the client device 102. Such recommended sequence may be a data structure of one or more recommended sequences associated with metadata for each of the one or more recommended sequences. In accordance with an embodiment, the user 114 may be presented with each of the one or more recommended sequences of the one or more programs at the client device 102. Based on a selection of the recommended sequence from the presented one or more recommended sequences, the PPG 226 may be configured to communicate the personalized playlist of the one or more programs to the dynamic manifest generator 228.

The dynamic manifest generator 228 may comprise suitable logic, circuitry, and interfaces that may be configured to assimilate, prepare, encode, and stream a media stream of the media content that comprises the one or more programs of the personalized playlist. The assimilation and preparation of the media content is performed in conjunction with retrieval of the media content from at least the CS 224 and the CDN 104 associated with the media presentation and distribution system 108. The dynamic manifest generator 228 may comprise the SS 230 and the PLS 232, which may be communicatively coupled with each other.

The SS 230 may comprise suitable logic, circuitry, and interfaces that may be configured to assimilate, schedule, encode and package the one or more programs in the personalized playlist for playout to the client device 102. The SS 230 may be configured to retrieve the one or more programs as per a scheduled playout of the media content. The one or more programs may be retrieved by the SS 230 from at least the CDN 104 or the CS 224 for assimilation of the retrieved one or more programs. As for the uncompressed one or more programs, the SS 230 may be configured to encode each of the one or more uncompressed programs. The SS 230 may be configured to transmit the packaged media content to the PLS 232.

The PLS 232 may comprise suitable logic, circuitry, and interfaces that may be configured to encapsulate and stream the media content, received from the SS 230, on the media stream (which may be a transport media stream, such as an MPEG-2 TS stream). Additionally, the PLS 232 may be configured to encrypt and stream the media stream to the client device 102, via the network interface 202B. In accordance with an embodiment, the encrypted media stream may be segmented into one or more segments to facilitate adaptive bitrate streaming over to the client device 102 based on an availability of network bandwidth for the client device 102, associated with the user 114. The PLS 232 may be further configured to transmit a request to the TS 234 for a generation and an insertion of the one or more tags at determined candidate time-periods within the media content in the media stream. Such tags may be invoked at the client device 102 to facilitate presentation of the overlay-graphic items on the media content.

The TS 234 may comprise suitable logic, circuitry, and interfaces that may be configured to generate the one or more tags, associated metadata, and resources for tagging of the media content. The generation of each of the one or more tags may be based on the determined candidate time-periods within the media content. Each tag may specify a pointer to a duration of the corresponding event opportunity point within the media content, and a descriptor for the corresponding overlay-graphic items. The TS 234 may be further configured to transmit a request to the MAS 236 to provide the determined candidate time-periods within the media content and identify information associated with the overlay-graphic items for an overlay and a presentation at the determined candidate time-periods. Such request may be transmitted to the MAS 236 along with the personalized list of the one or more programs. The TS 234 may be further configured to insert the generated one or more tags at the determined candidate time-periods within the media content based on the received request from the client device 102.

The MAS 236 may comprise suitable logic, circuitry, and interfaces that may be configured to determine the candidate time-periods within the media content and identify information associated with the overlay-graphic items based on a context, a user-preference, or a defined goal for presentation of the overlay-graphic items at the determined candidate time-periods. In accordance with an embodiment, the MAS 236 may determine the candidate time-periods based on content recognition of the media content. In accordance with an embodiment, the MAS 236 may be configured to determine the candidate time-periods based on semantic or context mining of context of the media content. Further, the MAS 236 may be configured to identify the information associated with the overlay-graphic items for playback during the playback time of the determined candidate time-periods within the media content. The determined candidate time-periods, associated metadata, and the identified overlay-graphic items for presentation may be transmitted to the TS 234.

The EOS 238 may comprise suitable logic, circuitry, and interfaces that may be configured to operate as an ESAM server, which may manage execution, performance and personalization of the media content, and the overlay-graphic items for the user 114. In other words, the EOS 238 may be an event decision system that may be configured to respond to each request from the client device 102. Examples of such request may include, but are not limited to, a selection of the candidate time-periods within one or more occurrences of the candidate time-periods in the media content, a selection of the overlay-graphic items for presentation at a playback time, and the like. Additionally, the EOS 238 may be communicatively coupled with the GMS 240, the VS 244, and the NS 246. The EOS 238 may be configured to improve or factor decisions on the received requests from the client device 102, based on communication from the GMS 240, the VS 244, and the NS 246.

The GMS 240 may comprise suitable logic, circuitry, and interfaces that may be configured to manage one or more goal parameters for the presentation of each of the overlay-graphic items. The management of the one or more goal parameters may be based on granular measures of each of the one or more goal parameters to achieve the one or more goals in a corresponding flight. Examples of the one or more goal parameters may include, but are not limited to, impressions, views, clicks, sales, reach, and leads. The one or more goal parameters may be moderated by the GMS 240, in conjunction with a campaign manager. For example, an overlay-graphic item (C) may be associated with a goal parameter to achieve a specific number of impressions or views, such as "2 million" impressions on a "beverage graphic". The GMS 240 may be further configured to update each corresponding goal parameter during the presentation of the overlay-graphic item (C) at the client device 102.

The CMS 242 may comprise suitable logic, circuitry, and interfaces that may be configured to manage retrieval and delivery of the overlay-graphic items to the client device 102, via the communication network 112. The CMS 242 may receive a request from the client device 102 to provide the overlay-graphic items for an overlay with the received media content, at the client device 102. Based on the received request, the CMS 242 may prepare the requested overlay-graphic items, encrypt, and transmit the overlay-graphic items to the client device 102.

The VS 244 may comprise suitable logic, circuitry, and interfaces that may be configured to verify the presentation of the overlay-graphic items on the media content, at the client device 102. In some implementations, the displayed view of the client device 102 may be configured for one or more modifications, such as display partitioning, transitions, digital video effects (for example, squeeze back, hot start, etc.), pip, focus, zoom, and scaling. The VS 244 may be further configured to verify the one or more modifications at the display view of the client device 102 and the presentation of the overlay-graphic items within the modified display view of the client device 102. The VS 244 may implement at least defined heuristic, machine learning, content recognition, or secured public/private key based authentication methods or beacons to verify the presentation of the overlay-graphic items at the display view of the client device 102.

The NS 246 may comprise suitable logic, circuitry, and interfaces that may be configured to generate and transmit one or more notifications to the one or more delivery platforms associated with the one or more delivery devices 110. The NS 246 may further receive responses over the one or more notifications. Such one or more notifications may be generated as per specification of the associated one or more delivery platforms. For example, a notification may be generated as per a specification of an e-mail delivery platform, another notification may be generated for a popup notification for a webpage, and yet another notification for a push-notification that redirects to a user-interface of an application engine at the client device 102 or the one or more delivery devices 110. As an example, a user may engage with an overlay-graphic item of a "coffee bug" based on a participation in a poll, which may be displayed for "10 seconds" at the client device 102. The NS 246 may receive engagement metadata, and may further generate the one or more notifications to provide a poll summary and a bundled discount coupon for a next purchase of the coffee promoted via the "coffee bug".

The CU 248 may comprise suitable logic, circuitry, and interfaces that may be configured to monitor, control and calibrate operations of each component of the media presentation and distribution system 108, via one or more control signals. Each component may be monitored, controlled, and calibrated for synchronized and lag-free operations for the requests received from the client device 102. The CU 248 may comprise a monitoring system (MS) 248A, a command and control system (CCS) 248B, and an operation and maintenance system (OMS) 248C.

The MS 248A may comprise suitable logic, circuitry, and interfaces that may be configured to monitor execution and performance of the operations performed by each component of the media presentation and distribution system 108. The CCS 248B may comprise suitable logic, circuitry, and interfaces that may be configured to generate and issue commands to control a flow of operations of each component of the media presentation and distribution system 108, via the issued commands. The OMS 248C may comprise suitable logic, circuitry, and interfaces that may be configured to perform various operational and maintenance activities of each component of the media presentation and distribution system 108. Although not illustrated in FIG. 2B, the MS 248A may include a dedicated CCS and an OMS, without a deviation from scope of the disclosure.

In operation, the network interface 202B of the media presentation and distribution system 108 may be configured to receive a request from the client device 102 associated with user 114, via the communication network 112. The received request may correspond to a request to stream the media content at the client device 102. Such media content may be personalized for the user 114 based on one of one or more request parameters. The one or more request parameters may include, but are not limited to, a request time, the one or more preferences for the media content, device data, network configuration, network IP, device IP and client device 102 type.

The network interface 202B may route the received request to the PS 218. The PS 218 may be configured to extract the one or more request parameters from the received request and parse the one or more request parameters in each received request from the client device 102. The PS 218 may operate as a front-end of the DMS 220 and communicate the parsed one or more request parameters to the DMS 220 and the CDS 222. In some embodiments, the PS 218 may further include a catalogue store (not shown). The catalogue store may include a VOD catalogue of available programming media content and a live catalogue society of cable telecommunication engineers (SCTE)-224 schedule) of available programming media content.

The DMS 220 may be configured to store and collate the parsed one or more request parameters with a set of user-attributes of the user 114. The parsed one or more request parameters may define granular interests of the user 114 and therefore, the DMS 220 may generate semantic relationship models (shallow or deep) based on associations built among the granular interests for the corresponding one or more request parameters. Thereafter, the DMS 220 may store and form a data cloud of the one or more preferences, likes, dislikes for the media content and the overlay-graphic items, demography, financial information, location, and the like. Such data cloud for the user 114 may be generated from sources, such as social media footprints, web footprints, searches, past engagements with the media content, and specific overlay-graphic items.

For example, for a user "Alex", the DMS 220 may receive a parsed request parameter that comprises a preference for a "lifestyle" genre, associated with searched keywords "Travel" and "Food". The DMS 220 may retrieve the set of user-attributes associated with the searched keywords or the request parameter. Based on the retrieved set of user preferences, the DMS 220 may infer that "Alex" has a liking for "Paris", "Atlanta", and "Street Food" and a preference for "sea-based locations". The DMS 220 may identify that "Alex" dislikes "Meat Products" and "Cheese Products" from social media footprints. Therefore, the DMS 220 may form a relationship model that may be used to ascertain that "Alex" may be a "Vegan" and may be served with overlay-graphic items, such as video advertisements or bugs, or the media content, which may promote or showcase vegan food around the preferred travel location.

Each preference, like, or dislike may be factored as one or more features for a certain semantic relationship model and each relationship model may be generated based on factoring the one or more features, which may be "1000" or even "10000" for a given scenario. Accordingly, the DMS 220 may further update records for the parsed one or more request parameters, and the generated the relationship models within the user database. Data associated with the user 114 may be shared by the DMS 220 with the PS 218 in response to request received from the PS 218.

The CDS 222 may be configured to identify available one or more programs that may bear correlation with the parsed one or more request parameters or the generated relationship models. For such identification, in one implementation, the CDS 222 may search for available one or more programs within a curated repository of programs in the CS 224. In other implementation, the CDS 222 may utilize the catalogue store to search for available one or more programs within a curated repository of programs in the CS 224. Alternatively, the CDS 222 may search for available one or more programs from media servers of the CDN 104. The CDS 222 may identify the available one or more programs for the user 114, based on the one or more user preferences, one or more targeting parameters, such as location, playback history, demography, age and gender, and applicable content rights. In accordance with an embodiment, the identified one or more programs may be ranked and sorted for the user 114. After identification of the available one or more programs, the CDS 222 may be configured to obtain or negotiate content rights, permissions, or certificates for the identified one or more programs for playout to the client device 102. The content rights, permissions, or certificates for the identified one or more programs may be obtained from the graphics and rights database 224A of the CS 224. Alternatively stated, the CDS 222 may identify the preferred media content, which may optimally satisfy the requirement of the user 114. The CDS 222 may transmit metadata for the identified one or more programs to the PPG 226.

For example, a user "Smith" may have a preference for "News" from "Georgia", a liking for "Sports News" and a dislike for "Crime News". The CDS 222 may search for available programs within the CS 224 or the CDN 104 that be factored based on preferences, likes or dislikes of "Smith". Accordingly, the CDS 222 identifies "X1_News", "X2_News" and "X3_News" for "Smith". Such programs may be sorted and arranged in an order of relevance for "Smith".

The PPG 226 may be configured to receive the metadata for the identified one or more programs from the CDS 222 and generate a personalized playlist of the identified one or more programs. The personalized playlist may correspond to a recommended sequence of one or more programs for the corresponding one or more request parameters in the received request at the PS 218. Such recommended sequence may be a data structure of one or more recommended sequences associated with metadata for each of the one or more recommended sequences. In an exemplary scenario, one or more recommended sequences of programs of different lengths may be sorted and generated by the CDS 222. The user 114 may be presented with each of the one or more recommended sequences of the one or more programs at the client device 102. Based on a selection of a recommended sequence from the presented one or more recommended sequences, the PPG 226 may transfer the personalized playlist of the one or more programs to the dynamic manifest generator 228.

The SS 230 of the dynamic manifest generator 228 may encode the uncompressed one or more programs in the personalized playlist. The SS 230 in the dynamic manifest generator 228 may be further configured to assimilate, schedule, and package the encoded one or more programs in the personalized list, in conjunction with the CS 224 or the CDN 104. The encoding, assimilation, scheduling, and packaging of the one or more programs as the media content may be performed for the media content retrieved from at least the CS 224 and the CDN 104. For assimilation and scheduling, the SS 230 may retrieve the one or more programs as per the personalized playlist, as scheduled for playout at the client device 102. The packaged media content of the one or more programs may be transmitted to the PLS 232. The programming media content that is prepared by the dynamic manifest generator 228 may include at least one of, or a combination thereof, but not limited to, VOD media content, linear media content, live media content, VOD to VOD programming media content, VOD to live programming media content, live to live programming media content, and live to VOD programming media content. Such diverse types of programming media content may be generated based on implementation of functions on dynamically modifiable manifest information generated at the dynamic manifest generator 228.

A request, from the PLS 232, for the generation and the insertion of the one or more tags at candidate time-periods within the media content of the media stream may be transmitted to the TS 234. Such tags may be invoked at the client device 102 during playout of the media content within the media stream and therefore, may facilitate the presentation of the overlay-graphic items on the media content. Based on the received request, the TS 234 may request the MAS 236 to determine the candidate time-periods within the media content and identify information associated with the overlay-graphic items for the presentation at the determined candidate time-periods.

The MAS 236 may further determine the candidate time-periods within the media content of the media stream and identify the information associated with the overlay-graphic items. Example of the information associated with the overlay-graphic items may include, but are not limited to, contexts, durations, graphic type, and goal definitions. The information may be used to derive context tags, preference tags associated the one or more preferences of the user 114 or goals tags for the overlay-graphic items. In certain embodiments, the MAS 236 may be configured to determine one or more contextually relevant durations within the media content. The MAS 236 may be further configured to select the overlay-graphic items for presentation on the media content at the client device 102 based on a context of the overlay-graphic items and the determined one or more contextually relevant durations within the media content.

In other embodiments, the MAS 236 may be configured to retrieve the set of user-attributes for the user 114 from the DMS. Thereafter, the MAS 236 may be configured to select the overlay-graphic items for the presentation on the media content at the client device 102. The selection of the overlay-graphic items may be based on the retrieved set of user-attributes for the user 114. Example of the user-attributes may include, but are not limited to, user preferences, age range, location, gender, and specific demographic factors.

For example, an episode of a prime-time news program may be based on a debate between an anchor and one or more participants. Such episode may comprise credits for a news cast, a first lull point at a time when the anchor is waiting for the one or more participants to speak, a second lull point when a participant is engaged in an irrelevant discussion with other participants or the anchor, and a contextually relevant point when the news anchor sips a cup of coffee. The MAS 236 may determine such contextually relevant point suitable for the presentation of a coffee bug or a coffee graphic. The candidate time-periods, such as credits, lull points, and contextually relevant points, may be further determined from the media content, such as the episode of the news program in the aforementioned example. In certain embodiments, the MAS 236 may determine the candidate time-periods based on content recognition of the media content within the media stream. In other embodiments, the MAS 236 may determine the candidate time-periods based on semantic or context mining of the media content within the media stream.

The MAS 236 may identify the information associated with the overlay-graphic items for the presentation at the determined candidate time-periods within the media content. Such information may be identified in conjunction resources from the CS 224. The information associated with the overlay-graphic items may comprise one or more presentation attributes for the overlay-graphic items. The one or more presentation attributes may be personalized for the user 114 based on one of stored preferences of the user 114 or a requirement of the graphic-provider. Such one or more presentation attributes may be modified based on real time goal requirements for a presented overlay-graphic item at the client device 102.

In some embodiments, the information associated with the overlay-graphic items may be identified based on a degree of correlation of a context of the overlay-graphic items with a corresponding context for the media content at the candidate time-periods. The overlay-graphic items may be selected for the presentation on the media content based on significant degree of correlation of the determined context of the overlay-graphic items on the media content. In other embodiments, the overlay-graphic items may be identified based on one or more goals defined by the GMS 240. Examples of the one or more goals may include, but are not limited to, impressions, reach, clicks, views, and sales for the offerings associated with the overlay-graphic items.

The MAS 236 may transmit the determined candidate time-periods, associated metadata, and the identified information associated with the overlay-graphic items to the TS 234. The TS 234 may be configured to generate the one or more tags, associated metadata, and resources for the media content within the media stream. The generation of each of the one or more tags may be performed for the determined candidate time-periods within the media content. The generated one or more tags may be inserted by the TS 234 at the determined candidate time-periods within the media content. Each tag may specify at least a pointer to a candidate time-period within the media content and a descriptor for the corresponding overlay-graphic items to be presented on the media content at the client device 102.

Encapsulation may be performed by the PLS 232 on the encoded media content, as received from the SS 230, to obtain an encrypted media stream of the media content, which may correspond to a transport media stream, such as an MPEG-2 TS stream. The PLS 232 may encrypt the media stream for secure playout at the client device 102 associated with the user 114. The encrypted media stream may be segmented by the PLS 232 into one or more segments, and such encrypted media stream may be segmented to facilitate adaptive bitrate streaming (ABS) over to the client device 102, via the communication network 112. The ABS may be based on an availability of network bandwidth for the client device 102. The PLS 232 may stream the encrypted media stream, inserted with the one or more tags, to the client device 102, via the communication network 112. The transmission of the media stream to the client device 102 may be performed via one of the HLS technique, the DASH technique, and the like.

In accordance with an embodiment, the TS 234 may be further configured to generate a client manifest for the segmented media stream of the media content. The client manifest may correspond to a data structure for at least the one or more tags, uniform resource identifiers (URIs) for the one or more segments, URIs for the overlay-graphic items, metadata for the one or more tags, and the like. The client manifest may be transmitted along with the segmented media stream to the client device 102, via the communication network 112.

The PLS 232 may transmit the media stream of the media content associated with one or more tags to the client device 102. The CMS 242, in conjunction with the PLS 232, may be further configured to retrieve, package, encode and transmit the overlay-graphic items to the client device 102. Additionally, one or more identifiers may be embedded with the transmitted overlay-graphic items or the media content. The CMS 242 may receive selections of the overlay-graphic items from the EOS 238 for playback at the client device 102. In other words, the EOS 238 may decide what type of overlay-graphic items should be played for the user 114 for a determined candidate time-period and may factor decisions based on inputs from DMS 220, GMS 240, and NS 246.

As an example, for a candidate time-period for presentation of a "Questionnaire Graphic" on US election, the EOS 238 may decide whether such "Questionnaire Graphic" should be presented for the user 114 and whether a context of the "Questionnaire Graphic" matches the context of the media content that the user 114 may be engaged with. Additionally, the EOS 238 may further decide whether the target voter base of "1 million votes" on "Questionnaire Graphic" has been achieved and whether the flight time for the "Questionnaire Graphic" has been completed. To factor the decisions, the EOS 238 may retrieve information or other parameters from at least the GMS 240, the DMS 220, and the NS 246.

As another example, for a candidate time-period for presentation of a "Pizza Bug" during a basketball match, the EOS 238 may decide whether such "Pizza Bug" should be presented for the user 114 and whether a lull point in the match requires presentation of the "Pizza Bug". Additionally, the EOS 238 may further decide whether the target impressions/sale figure of "100,000" for "Pizza Bug" has been achieved and whether the flight time for the "Pizza Bug" has been completed.

The operations performed by the client device 102 for the presentation of the overlay-graphic items on the media content has been described in FIG. 2A in detail. In certain embodiments, the presentation of the overlay-graphic items may be verified at the VS 244. Such verification may be done in order to reduce usage of computational resources of the client device 102. The VS 244 may be configured to verify the presentation of the overlay-graphic items at the playback time of the media content at the client device 102. For verification, the VS 244 may be configured to process each corresponding overlay-graphic item at the playback time based on at least one of a detection of beacons embedded with the media content, content recognition of the overlay-graphic items at the verification server, a validation of playback log received from the client device 102, and a virtual instance based verification of the presentation of the overlay-graphic items.

Such server-side verification may be based on one or more techniques, which may identify one or more deviations with the playback of the overlay-graphic items at the display view of the client device 102. Example of the one or more deviations may include, but are not limited to, a partial overlay, a color imbalance, an error with transition or overlay, an abrupt disappearance of the overlay-graphic items or the media content from the modified display view, and a non-responsive playback of the overlay-graphic items. In response to the detection of the one or more deviations, the VS 244 may be configured to trigger, in conjunction with the media presentation and distribution system 108, circuitries or programmable routines to adjust or correct the detected one or more deviations with the playback of the media content and the overlay-graphic items at the display view of the client device 102.

For example, a user (P) may be engaged with an NBA match, played on-demand at the display view of the client device 102. A time-out or foul happens during the NBA match and based on a tag at the foul time or the time-out, the graphics engine 102A may present a bug for a "beverage brand X" at the rightmost corner of the displayed view at the client device 102. The VS 244 may receive a playback log for the detection of an identifier embedded with the "beverage brand X" bug. Based on the log, the VS 244 may be further configured to simulate the placement of the "beverage brand X" bug at a virtual client of the client device 102. The VS 244 may further identify deviations with overlay of the "beverage brand X" bug within the simulation of the virtual client. For deviations, such as, delay of 10 seconds for appearance of the "beverage brand X" bug, the VS 244 may send control signals having debugging routines to the client device 102 for near real time adjustment or correction of the recorded deviation.

The NS 246 may be configured to generate and serve one or more notifications to at least the display view of the client device 102, one or more delivery platforms, or one or more delivery devices 110, associated with the client device 102 of the user 114. Based on a defined set of rules, the one or more notifications may be generated for the candidate time-periods within the media content. Such one or more notifications may be intended to at least inform the user 114 about a presented overlay-graphic item, an engagement of the user 114 with the presented overlay-graphic item, a promotional offer on the promoted offering with the presented overlay-graphic item, and the like. The defined set of rules for generation of the one or more notifications may comprise a user-defined constraint, a client-device constraint, a defined goal of impressions, reach or views, a defined time of generation of the one or more notifications, and a specified type of the one or more notifications, for example, push, pop-up, fixed, and interactive notifications. Each of the one or more notifications may provide one or more selectable options to provide a request for one or more services. Such service may correspond to an engagement of the user 114 with the offering presented an overlay-graphic item.

The NS 246 may be further configured to receive a request based on a response from the user 114 over the served one or more notifications. Example of the one or more services may include, subscriptions, payments, registrations, upgrades, updates, purchases, transactions, signup, sign in, for one or more products, services or event offerings, which may be promoted by the presented overlay-graphic items on the media content. Additionally, the NS 246 may transmit the responses over the requests received over the served one or more notifications to the EOS 238. The EOS 238 may be configured to instruct the presentation of the overlay-graphic items or the media content for the received request from the user 114.

The operations of each component of the media presentation and distribution system 108 may be monitored, controlled, and calibrated, via one or more control signals, by the MS 248A, the CCS 248B, and the OMS 248C of the CU 248. Each component may be monitored, controlled, and calibrated for synchronized and lag-free operations for the requests received from the client device 102.

Figure 3:
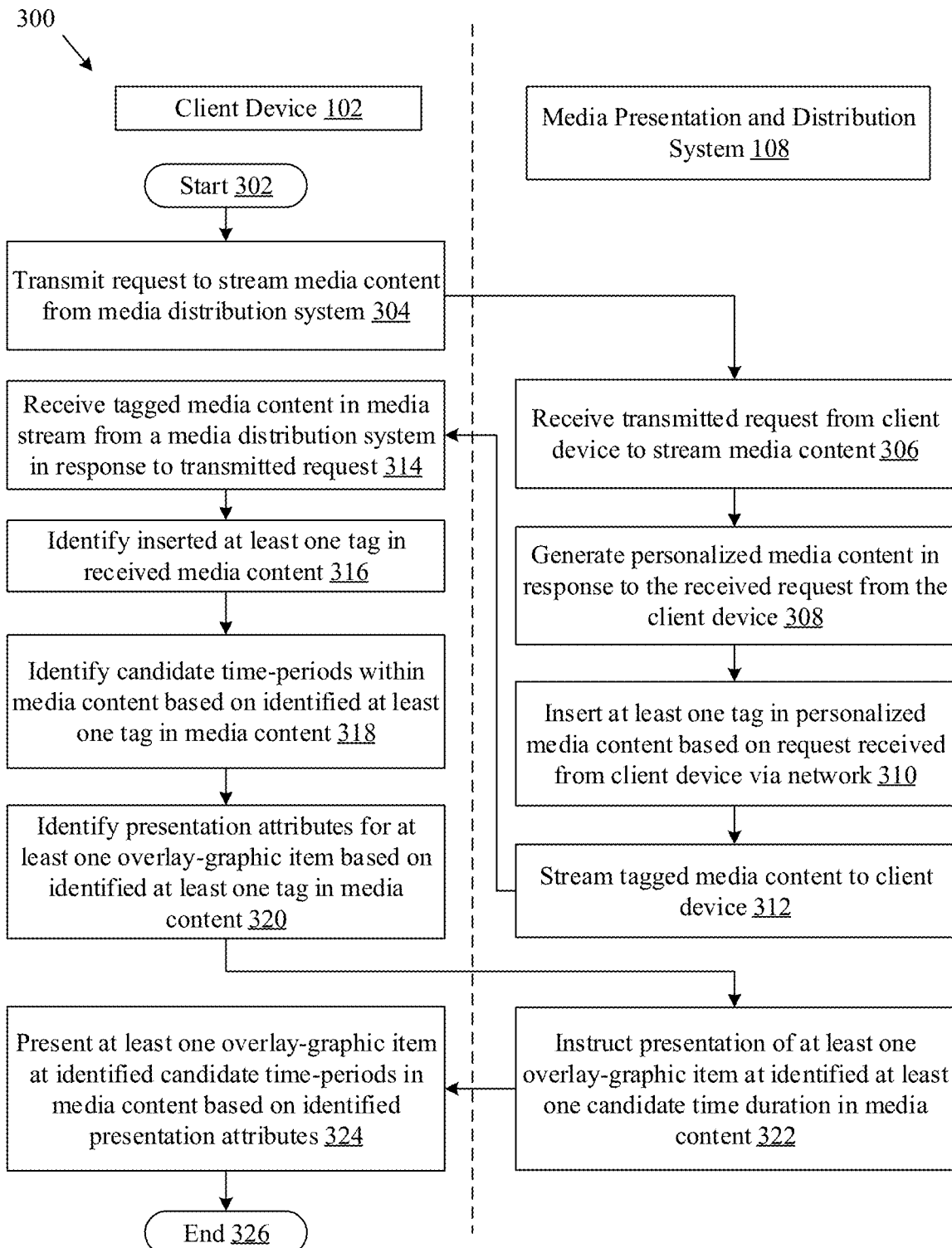
FIG. 3 is a flow chart that illustrates exemplary operations for client-side presentation of overlay-graphic items on media content, in accordance with an exemplary embodiment of the present disclosure.

FIG. 3 is a flow chart that illustrates exemplary operations for client-side presentation of overlay-graphic items on media content, in accordance with an exemplary embodiment of the present disclosure. FIG. 3 is described in conjunction with FIG. 1, FIG. 2A, and FIG. 2B. The exemplary operations for the client-side presentation of overlay-graphic items on media content may be shared between the client device 102 of FIG. 2A and the media presentation and distribution system 108 of FIG. 2B. With reference to FIG. 3, there is shown a flowchart 300. In FIG. 3, there is shown exemplary operations from 302 through 326. The exemplary operations may start at 302 and proceed to 304.

At 304, a request to stream media content may be transmitted to the media presentation and distribution system 108. In accordance with an embodiment, the request engine 206 of the client device 102 may be configured to transmit the request to the media presentation and distribution system 108 to stream the media content. The request may be associated with one or more preferences of the user 114 for the media content and may correspond to personalization of the media content, for example, VOD media content (as described in detail in FIG. 2A).

At 306, the transmitted request from the client device 102 to stream the media content may be received. The PS 218 of the media presentation and distribution system 108 may be configured to receive the transmitted request from the client device 102, to stream the media content. The transmitted request may comprise one or more request parameters from the user 114, for example, described in FIG. 2A.

At 308, personalized media content may be generated in response to the received request from the client device 102. The SS 230 may be configured to generate the personalized media content in response to the received request from the client device 102. The personalized media content may be generated based on a personalized playlist generated by the PPG 226 based on the received request.

At 310, one or more tags may be inserted in the personalized media content based on the request received from the client device 102, via the communication network 112. The TS 234 may be configured to insert the one or more tags in the personalized media content based on the request received from the client device 102. The TS 234 may utilize information from the MAS 236 to generate and insert such one or more tags in the personalized media content.

At 312, tagged media content may be streamed to the client device 102. The PLS 232 may be configured to stream the tagged media content to the client device 102. The tagged media content may be encapsulated on a media stream, such as MPEG-4 stream, and may be encrypted and segmented into different streams for ABR at the client device 102.

At 314, the tagged media content in the media stream may be received from the media presentation and distribution system 108 in response to the transmitted request. The media preprocessing engine 208 of the client device 102 may be configured to receive the tagged media content in the media stream from the media presentation and distribution system 108 in response to the transmitted request.

At 316, the inserted one or more tags may be identified within the received media content. The media preprocessing engine 208 of the client device 102 may be configured to identify the inserted one or more tags within the received media content. Such identification may be based on detection of the one or more identifiers, such as Nielsen ID3 tags, beacons, (Society of Cable Telecommunication Engineers) SCTE-35 messages, and digital watermarks, embedded with the one or more tags.

At 318, at least one candidate time-period may be identified in the received media content based on the identified one or more tags in the media content. The media preprocessing engine 208 may be configured to identify the candidate time-periods in the received media content based on the identified one or more tags in the media content. The candidate time-periods may correspond to relevant durations for the presentation of the overlay-graphic items on the media content.

At 320, one or more presentation attributes may be identified for the overlay-graphic items based on the identified one or more tags in the media content. The media preprocessing engine 208 may be configured to identify the one or more presentation attributes for the overlay-graphic items. Such determination may be based on the identified one or more tags and associated client manifest for the media content.

At 322, presentation of the overlay-graphic items may be instructed at the identified candidate time-periods within the media content. The EOS 238 of the media presentation and distribution system 108 may be configured to instruct the presentation of the overlay-graphic items at the identified candidate time-periods in the media content. The instructed presentation may be attributed to decisions taken by the EOS 238 for the presentation of the overlay-graphic items. Such decisions may be based on inputs provided by the DMS 220, the GMS 240, and the NS 246.

At 324, the overlay-graphic items may be presented at the identified candidate time-periods in the media content in accordance with the identified one or more presentation attributes. The graphics engine 102A may be configured to present the overlay-graphic items at the identified candidate time-periods within the media content. Such presentation may be done in accordance with the determined one or more presentation attributes. Control passes to end at 326.

Figure 4A:
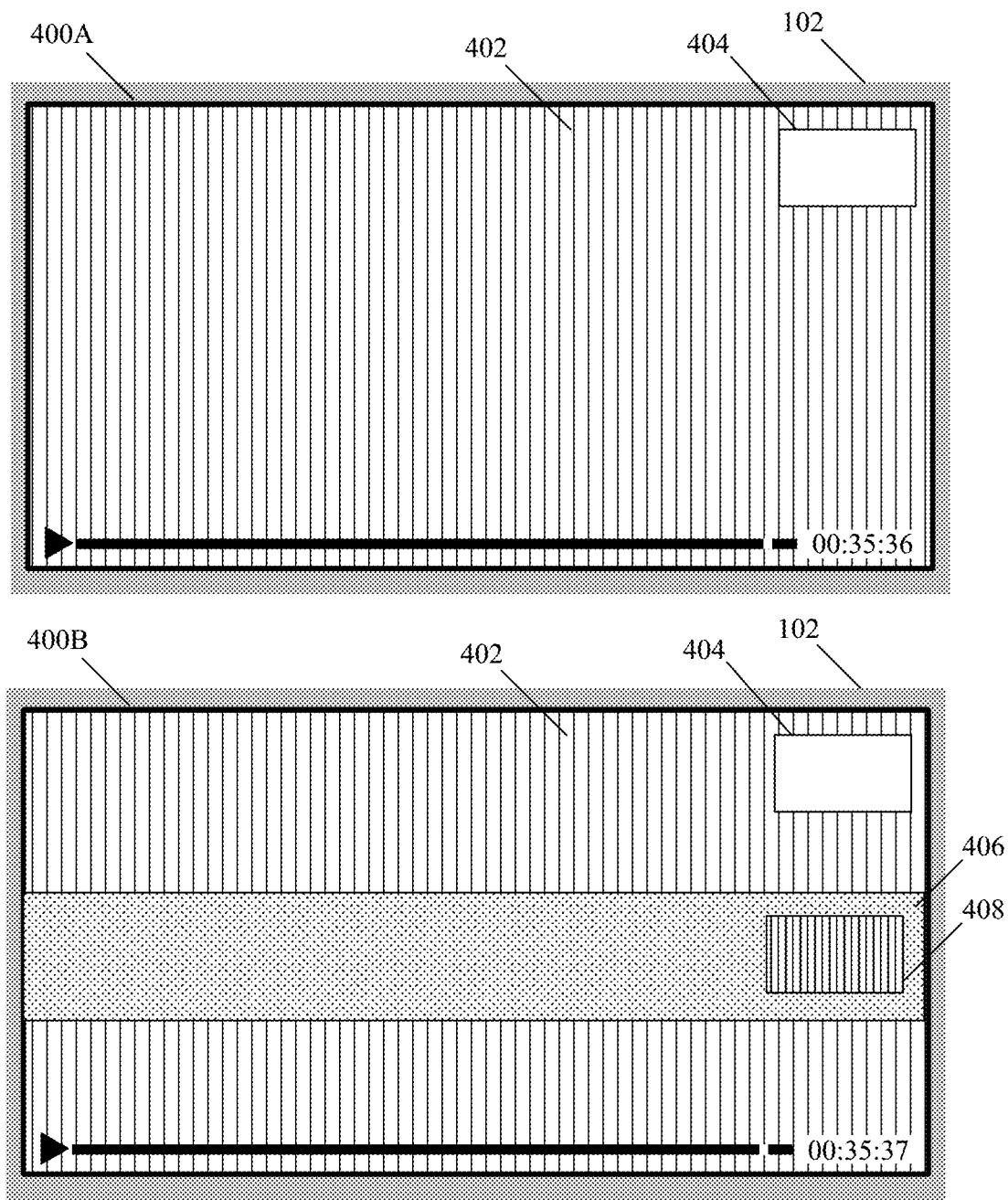
FIG. 4A illustrates an example of a display view of the client device for the presentation of multiple overlay-graphic items on the media content, in accordance with an embodiment of the present disclosure.

FIG. 4A illustrates an example of a display view of the client device 102 for the presentation of multiple overlay-graphic items on the media content, in accordance with an embodiment of the present disclosure. FIG. 4A is explained in conjunction with, for example, FIG. 1, FIG. 2A, and FIG. 2B. In FIG. 4A, there is shown a timelined view of the client device 102. The timelined view of the client device 102 may comprise a display view 400A and a display view 400B of the client device 102.

The display view 400A displays a media player to play a program 402 at a first time, such as "00:35:36". The user 114 may be engaged with the program 402, as played by the media player at the display view 400A of the client device 102. A channel logo 404 may be rendered by the media player during the playback of the program 402. The program 402 may be played out from a media stream of the program 402, which may be personalized for the user 114. At a time of "00:35:37", a tag may be identified by the media player for a presentation of a graphic-logo 408 over a graphic item 406, for a candidate time-period of 1 minute from the specific time of "00:35:37". After the client device 102 detects the tag at the specified time, a request to select the identified candidate time-period is transmitted to the EOS 238 of the media presentation and distribution system 108. The EOS 238 may select or reject an opportunity to present the graphic-logo 408 over the graphic item 406, at the identified candidate time-period. Such decisions may further depend on the defined presentation criteria, such as defined goals, user-defined constraints, device-constraints, and inventory constraints. After the candidate time-period is selected, the graphics engine 102A of client device 102 may overlay the graphic-logo 408 and graphic item 406 as stacked layers of graphic-items over the display view 400B of the program 402, at the client device 102. Such overlay and presentation may be done, in conjunction with the graphics engine 210 of the client device 102.

Figure 4B:
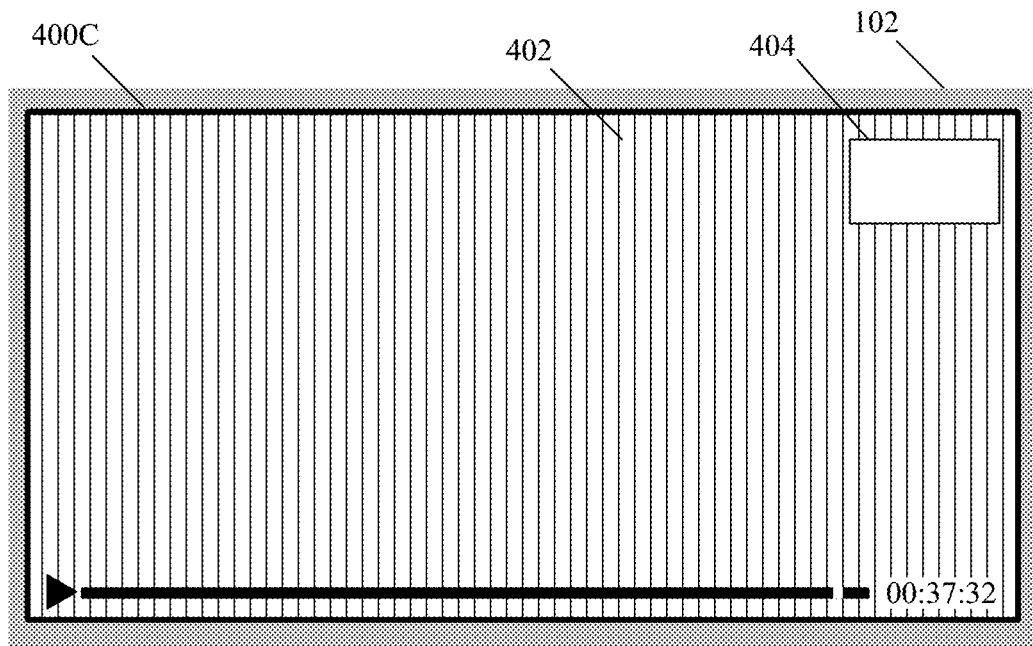
FIG. 4B illustrates an example of a display view of the client device for the presentation of multiple overlay-graphic items on the media content, in accordance with an embodiment of the present disclosure.
Figure 4B:
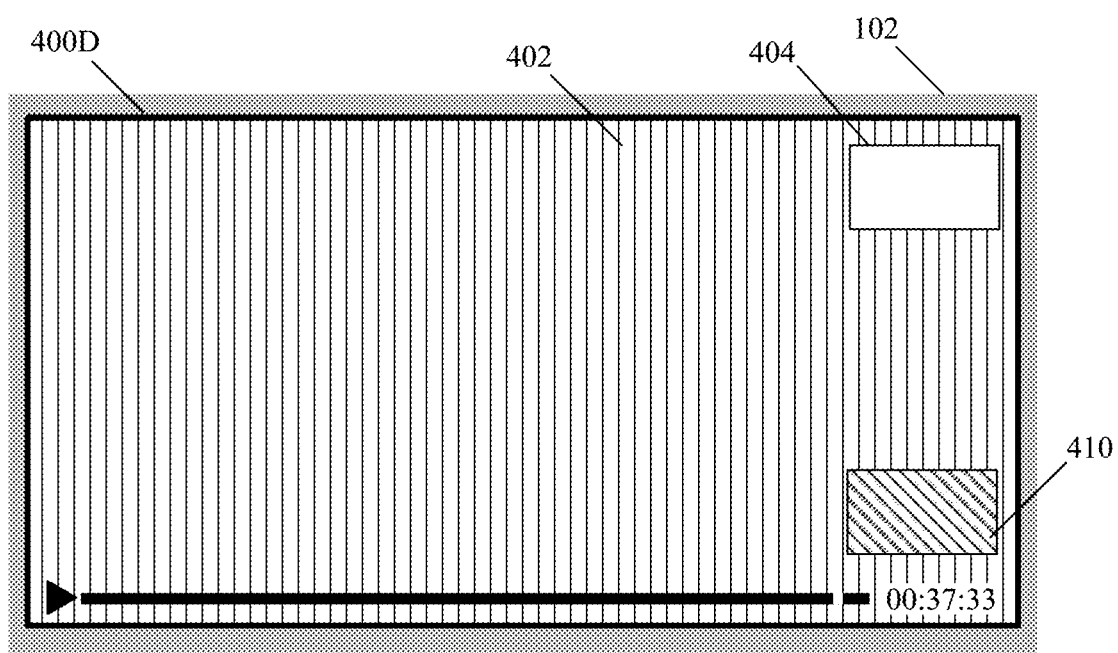

FIG. 4B illustrates an example of a display view of the client device 102 for the presentation of multiple overlay-graphic items on the media content, in accordance with an embodiment of the present disclosure. FIG. 4B is explained in conjunction with the FIG. 1, FIG. 2A, FIG. 2B, and FIG. 4A. In FIG. 4A, there is shown a timelined view of the client device 102. The timelined view of the client device 102 may comprise a display view 400C and a display view 400D of the client device 102.

The display view 400C displays a media player to play a program 402 at a time, such as "00:37:32" after the time "00:35:36". The user 114 may be engaged with the program 402, as played by the media player at the display view 400C of the client device 102. The channel logo 404 may be rendered by the media player during the playback of the program 402. The program 402 may be played out from a media stream of the program 402, which may be personalized for the user 114. At a time of "00:37:33", a tag may be identified by the media player for a presentation of a bug-item 410 over a bottom right corner of the program 402, for a candidate time-period of 5 minutes from the specific time of "00:37:33". After the client device 102 detects the tag at the specified time, a request to select the identified candidate time-period is transmitted to the EOS 238 of the media presentation and distribution system 108. The EOS 238 may select or reject an opportunity to present the bug-item 410 over the program 402, for the identified candidate time-period. Such decisions may further depend on the defined presentation criteria, such as defined goals, user-defined constraints, device-constraints, and inventory constraints. After the candidate time-period is selected, the graphics engine 102A of client device 102 may overlay the bug-item 410 as a layer stacked over the display view 400D of the program 402, at the client device 102. Such overlay and presentation may be done, in conjunction with the graphics engine 210 of the client device 102.

Figure 5A:
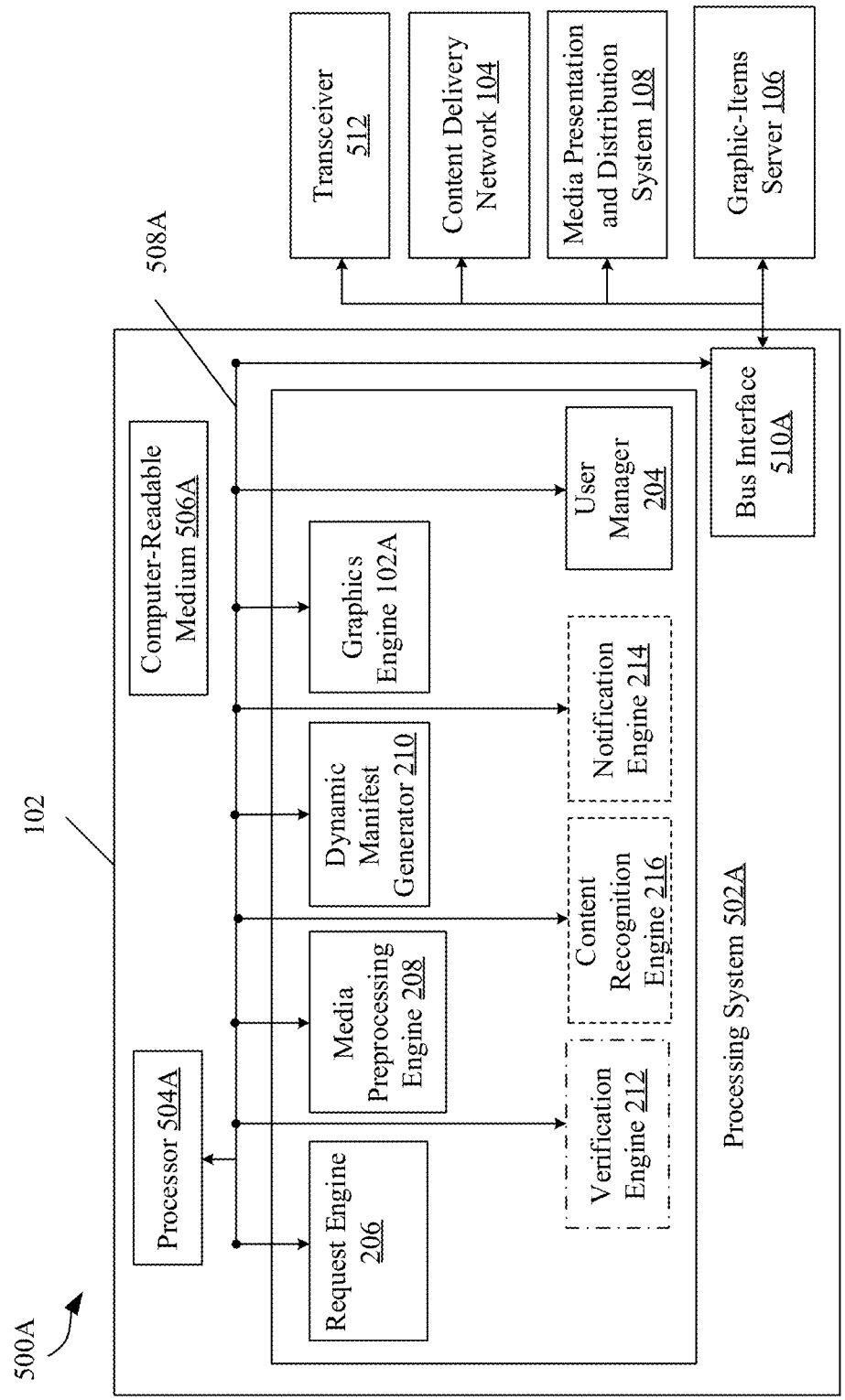
FIG. 5A is a diagram that illustrates an example of a hardware implementation for a client device that employs a processing system for client-side presentation of overlay-graphic items on media content, in accordance with an exemplary embodiment of the disclosure.

FIG. 5A is a diagram that illustrates an example of a hardware implementation for a client device 102 that employs a processing system for client-side presentation of overlay-graphic items on media content, in accordance with an exemplary embodiment of the disclosure. In FIG. 5A, the hardware implementation is shown by a representation 500A for the client device 102 for client-side presentation of overlay-graphic items on media content, in accordance with an exemplary embodiment of the disclosure, as described herein. In some examples, the processing system 502A may comprise one or more hardware processors 504A, a non-transitory computer-readable medium 506A, the user manager 204, the request engine 206, the media preprocessing engine 208, the graphics engine 102A, the verification engine 212, the notification engine 214, and the CR engine 216.

In this example, the client device 102 that employs the processing system 502A may be implemented with bus architecture, represented generally by a bus 508A. The bus 508A may include any number of interconnecting buses and bridges depending on the specific implementation of the client device 102 and the overall design constraints. The bus 508A links together various circuits including the one or more processors, represented generally by the hardware processor 504A, the non-transitory computer-readable media, represented generally by the computer-readable medium 506A, the user manager 204, the request engine 206, the media preprocessing engine 208, the graphics engine 102A the verification engine 212, the notification engine 214, and the CR engine 216, which may be configured to carry out one or more operations or methods described herein. A bus interface 510A provides an interface between the bus 508A and a transceiver 512A. The transceiver 512A facilitates communication via the communication network 112 (FIG. 1) with various other apparatus, such as the CDN 104, the media presentation and distribution system 108, and the graphic-items server 106.

The hardware processor 504A may be configured to manage the bus 508A and general processing, including the execution of a set of instructions stored on the computer-readable medium 506A. The set of instructions, when executed by the hardware processor 504A, causes the client device 102 to execute the various functions described herein for any particular apparatus. The computer-readable medium 506A may also be used for storing data that is manipulated by the hardware processor 504A when executing the set of instructions. The computer-readable medium 506A may also be configured to store data for one or more of the user manager 204, the request engine 206, the media preprocessing engine 208, the graphics engine 102A, the verification engine 212, the notification engine 214, and the CR engine 216.

In accordance with an aspect of the disclosure, the hardware processor 504A, the computer-readable medium 506A, or a combination of both may be configured or otherwise specially programmed to execute the operations or functionality of the user manager 204, the request engine 206, the media preprocessing engine 208, the graphics engine 102A, the verification engine 212, the notification engine 214, and the CR engine 216, or various other components described herein. For example, the hardware processor 504A, the computer-readable medium 506A, or a combination of both may be configured or otherwise specially programmed to perform the operations and functionality of the user manager 204, the request engine 206, the media preprocessing engine 208, the graphics engine 102A, the verification engine 212, the notification engine 214, and the CR engine 216 as described with respect to FIGS. 1, 2A, 2B, 3, 4A, and 4B.

Figure 5B:
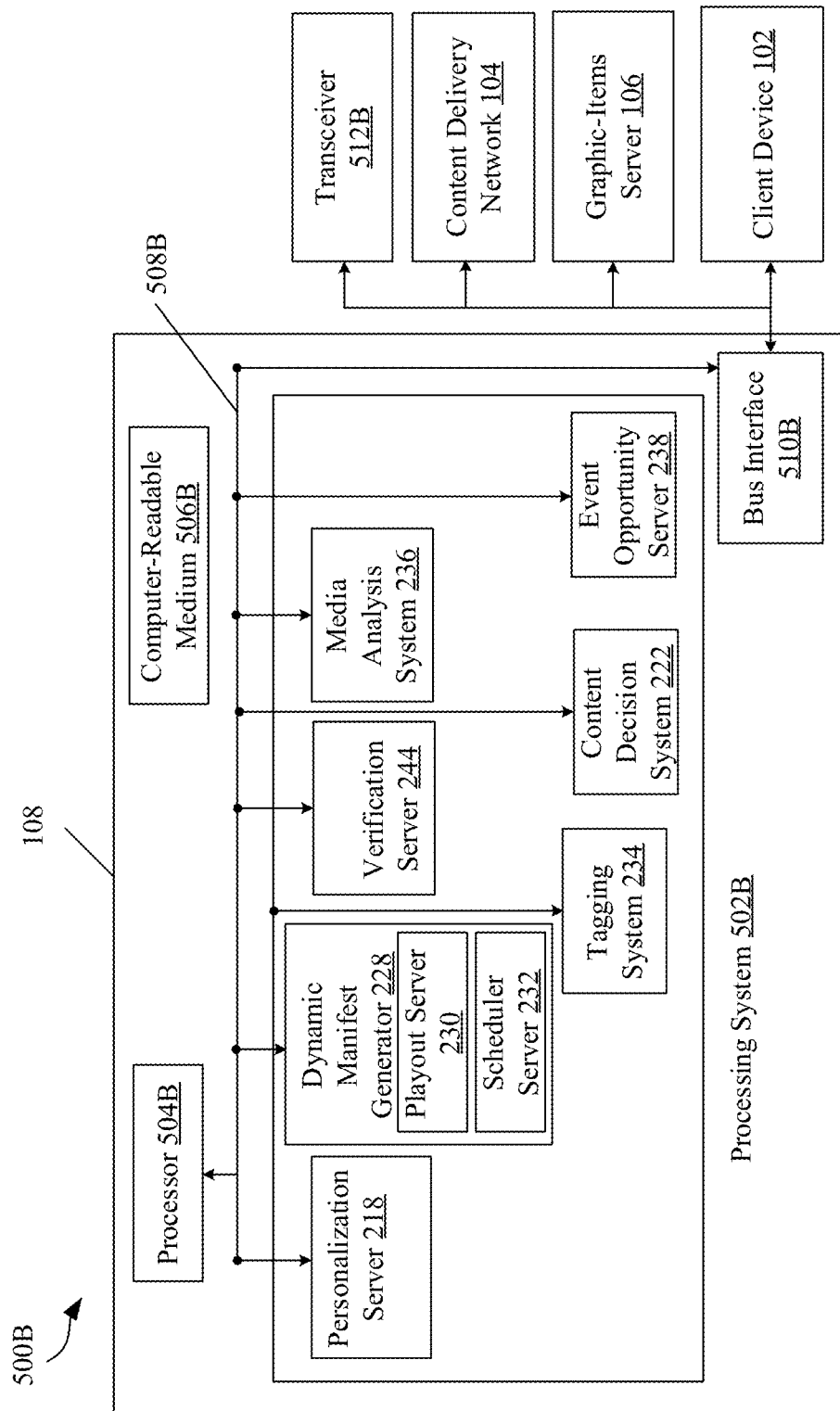
FIG. 5B is a diagram that illustrates an example of a hardware implementation for a media presentation and distribution system that employs a processing system to instruct client-side presentation of overlay-graphic items on media content, in accordance with an exemplary embodiment of the disclosure.

FIG. 5B is a diagram that illustrates an example of a hardware implementation for a media presentation and distribution system that employs a processing system to control client-side presentation of overlay-graphic items on media content, in accordance with an exemplary embodiment of the disclosure. In FIG. 5B, the hardware implementation is shown by a representation 500B for the media presentation and distribution system 108 for client-side presentation of the overlay-graphic items on the media content, in accordance with an exemplary embodiment of the disclosure, as described herein. In some examples, the processing system 502B may comprise the one or more hardware processors 504B, the non-transitory computer-readable medium 506B, the PS 218, the CDS 222, the dynamic manifest generator 228, the SS 230, the PLS 232, TS 234, the MAS 236, the VS 244, and the EOS 238.

In this example, the media presentation and distribution system 108 that employs the processing system 502B may be implemented with bus architecture, represented generally by the bus 508B. The bus 508B may include any number of interconnecting buses and bridges depending on the specific implementation of the media presentation and distribution system 108 and the overall design constraints. The bus 508B links together various circuits including the one or more processors, represented generally by the hardware processor 504B, the non-transitory computer-readable media, represented generally by the computer-readable medium 506B, the PS 218, the CDS 222, the dynamic manifest generator 228, the SS 230, the PLS 232, TS 234, the MAS 236, the VS 244, and the EOS 238, which may be configured to carry out one or more operations or methods described herein. A bus interface 510B provides an interface between the bus 508B and a transceiver 512B. The transceiver 512B facilitates communication via the communication network 112 (FIG. 1) with various other apparatus, such as the CDN 104, the client device 102, and the graphic-items server 106.

The hardware processor 504B may be configured to manage the bus 508B and general processing, including the execution of a set of instructions stored on the computer-readable medium 506B. The set of instructions, when executed by the hardware processor 504B, causes the media presentation and distribution system 108 to execute the various functions described herein for any particular apparatus. The computer-readable medium 506B may also be used for storing data that is manipulated by the hardware processor 504B when executing the set of instructions. The computer-readable medium 506B may also be configured to store data for one or more of the PS 218, the CDS 222, the dynamic manifest generator 228, the SS 230, the PLS 232, TS 234, the MAS 236, the VS 244, and the EOS 238.

In accordance with an aspect of the disclosure, the hardware processor 504B, the computer-readable medium 506B, or a combination of both may be configured or otherwise specially programmed to execute the operations or functionality of the PS 218, the CDS 222, the dynamic manifest generator 228, the SS 230, the PLS 232, TS 234, the MAS 236, the VS 244, and the EOS 238, or various other components described herein. For example, the hardware processor 504B, computer-readable medium 506B, or a combination of both may be configured or otherwise specially programmed to perform the operations and functionality of the PS 218, the CDS 222, the dynamic manifest generator 228, the SS 230, the PLS 232, TS 234, the MAS 236, the VS 244, and the EOS 238 as described with respect to FIGS. 1, 2A, 2B, 3, 4A, 4B, and 5A.

The present disclosure may provide several advantages over the traditional systems for the presentation of the overlay-graphic items on the media content. The bulk of processes for presentation and overlay of graphic-items is done by the client device 102, with decisioning still done at the media presentation and distribution system 108. The media presentation and distribution system 108 is left to identify, package and transmit media content and overlay-graphic items to the client device and further to select the overlay-graphic items for playback on the media content. As the client device 102 shares the bulk of processes, therefore, such configuration enables a network-bandwidth and memory efficient usage of communication network 112.

As the client device 102 encodes/overlays and presents the overlay-graphic items, the presentation quality of the overlay-graphic items is agnostic of variations in the network bandwidth. The media content and the overlay-graphic items are not packaged together and are transmitted as separate media packages to the client device 102. The client device 102 also overlays the overlay-graphic items as separate stacked layers over the media content, without affecting the playback of the media content. Such concurrency and parallel thread management for achieving such concurrency saves computational resources, processing power, and other memory-based resources for the client device 102. The present disclosure provides a way to shift the major operations on the client device without impacting the power consumption, battery usage, or affecting the availability of resources for other processes on the client device 102.

The presentation of the overlay-graphic items at the client device 102 facilitates a seamless viewing experience for the user 114 without a diversion in attention of the user 114. A response time of the user 114 may be further reduced as the overlay-graphic items may exhibit the presentation attributes, resolutions, content factored on demographic, hyper-local or past footprints of the user 114, responsive-behavior, and embedded messages, which are personalized for the user 114. The reduced response time further enhances user engagement with the overlay-graphic items played at during presentation at the client device 102. The overlay-graphic items are selected in a way to supplement a low interest during the playback of the media content at the client device 102. A likelihood of an engagement of the user associated with the client device 102 increases based on the targeted selection of the candidate time-periods. Such targeted selection and presentation at the client device 102 further improves an attention span of the user, such as engagements with content or offerings presented in the media content and the overlay-graphic items and therefore, a transient attention span of the user may be converted to a sustained attention span for the overlay-graphic items. Such sustainability of attention span improves an audience churn rate or attrition rate for a given media network. The response over notifications may determine intent of the user with respect to the overlay-graphic items and therefore, provide an efficient way to personalize such interests, and target the user 114 with different services that suit the user-attributes. Example of the user-attributes may include, but are not limited to, user preferences, age range, location, gender, and specific demographic factors.

Certain embodiments of the present disclosure may provide a system that may include one or more circuits in a client device. The one or more circuits in the client device may be configured to present overlay-graphic items at the client device. The one or more circuits (hereinafter, referred to as a circuitry) may receive a media stream from a media presentation and distribution system via a network. The received media stream may comprise at least media content and at least one tag. The circuitry may further identify the at least one tag within the media content. The identified at least one tag may correspond to the at least one overlay-graphic item. The circuitry may further determine at least one candidate time-period within the media content in the media stream based on the identified at least one tag within the media content. At least one presentation attribute for the at least one overlay-graphic item may be further determined based on the identified at least one tag within the media content. The circuitry may be further configured to present the at least one overlay-graphic item at the determined at least one candidate time-period within the media content. Such presentation may be based on the determined at least one presentation attribute. The at least one overlay-graphic item may be concurrently presented with the media content with a visual quality that may be agnostic of at least a first variation in the bandwidth of the network and a second variation in visual quality of the associated media content.

The at least one candidate time-period may correspond to at least one time duration to display the at least one overlay-graphic item over the media content. The at least one candidate time-period comprises at least one credit period, at least one lull period within the media content, at least one contextually similar time duration, and an ad duration within the media content. Similarly, the at least one presentation attribute may correspond to at least a behavior, a position, or an interactivity of the at least one overlay-graphic item, and the at least one presentation attribute may comprise a defined position within each frame of the media content, a resolution, a size, at least one transition effect of the at least one overlay-graphic item.

The visual quality may correspond to at least an image quality or a video frame quality that may be associated with at least a sharpness, a noise, a contrast, a color accuracy, a distortion, and at least one visual artifact attribute, and the media content may be presented via an adaptive bitrate streaming technique in accordance with the first variation in the bandwidth of the network.

In accordance with an embodiment, the circuitry may be configured to transmit a request to the media presentation and distribution system. The transmitted request may correspond to streaming of the media content via the media stream, and the transmitted request may be associated with at least one user-preference for the media content. The circuitry may be further configured to receive the media stream from the media presentation and distribution system, based on the transmitted request.

The identification of the at least one tag may be from a client manifest received from the media presentation and distribution system. The media stream may be received via one of a hypertext transport protocol (HTTP) Live Streaming (HLS) format, Microsoft smooth streaming, Dynamic Adaptive Streaming over HTTP (DASH), Protected HTTP Dynamic Streaming (PHDS), Protected HTTP Live Streaming (PHLS), or real time messaging protocol (RTMP). The media content may correspond to a personalized playlist of at least one media program in accordance with the transmitted at least one user-preference. In certain embodiments, the circuitry may render the at least one overlay-graphic item over the media content. Such rendering may be based on the identified at least one tag and a client manifest.

Certain other embodiments of the present disclosure may provide a system that may include one or more circuits in a media presentation and distribution system. The one or more circuits in the media presentation and distribution system may be configured to control a presentation of the overlay-graphic items at the client device. The one or more circuits (hereinafter, referred to as a circuitry) may insert at least one tag in the media content of a media stream. Such insertion may be based on a request received from the client device via a network. The inserted at least one tag may correspond to the at least one overlay-graphic item, which has to be presented at the client device.

At the client device, the circuitry of the client device may identify the inserted at least one tag within the media content. The identified at least one tag may correspond to the at least one overlay-graphic item. The circuitry may further determine at least one candidate time-period within the media content in the media stream based on the identified at least one tag within the media content. At least one presentation attribute for the at least one overlay-graphic item may be further determined based on the identified at least one tag within the media content. The circuitry of the media presentation and distribution system may further control a presentation of the at least one overlay-graphic item at the determined at least one candidate time-period within the media content. Such control may be based on the determined at least one presentation attribute at the client device. The at least one overlay-graphic item may be concurrently presented with the media content with a visual quality that may be agnostic of at least a first variation in bandwidth of the network and a second variation in visual quality of the associated media content.

In certain embodiments, the circuitry of the media presentation and distribution system may determine at least one contextually relevant duration within the media content of the media stream. Thereafter, the circuitry may select the at least one overlay-graphic item, which has to be presented over the media content at the client device. Such selection may be based on a context of the at least one overlay-graphic item and the determined at least one contextually relevant duration of the media content.

In other embodiments, the circuitry of the media presentation and distribution system may retrieve a set of user-attributes for a user associated the client device. Thereafter, the circuitry may select the at least one overlay-graphic item, which has to be presented over the media content at the client device. Such selection may be based on the retrieved set of user-attributes for the user.

In accordance with an embodiment, the circuitry of the media presentation and distribution system may transmit the media stream of the media content to the client device. Such transmission may be based on the received request. The transmitted media stream comprises the media content and the inserted at least one tag. In accordance with an embodiment, the circuitry of the media presentation and distribution system may verify the presentation of the at least one overlay-graphic item over the media content at the client device. The received request from the client device may be associated with at least one user-preference for the media content. The presented at least one overlay-graphic item may be rendered from a client manifest transmitted along with the media stream to the client device.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs) and graphical processing units (GPUs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the present disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the present disclosure may provide a non-transitory machine and/or computer readable storage and/or media, having stored thereon, a machine code and/or a computer program having one or more code sections executable by a machine and/or a computer, thereby causing the machine and/or computer to perform the steps as described herein to obtain a global workflow sequence.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the present disclosure described herein need not be performed in any particular order. Furthermore, although elements of the present disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:
1. A system, comprising:
a memory for storing instructions; and
a circuitry in a client device configured to execute the instructions, and based on the executed instructions, the circuitry is further configured to:
  receive a media stream from a media presentation and distribution system via a network,
    wherein the received media stream comprises media content and a tag, and
    wherein the media content comprises programming media content and non-programming media content;
  identify the tag in the media content based on a user-attribute of the client device;

wherein the identified tag corresponds to an overlay-graphic item;

identifying a candidate time-period in a playback duration of the media content based on the identified tag in the media content;

transmit a selection request to the media presentation and distribution system for selection of the candidate time-period in the media content,
wherein the candidate time-period is selected based on the tag at a specified time in the media content; and present the overlay-graphic item at the candidate time-period in the media content based on a degree of correlation between the identified tag in the media content and a corresponding context for the media content at the candidate time-period.

2. The system according to claim 1,
wherein the candidate time-period corresponds to a time duration to display the overlay-graphic item over the programming media content, and
wherein the candidate time-period comprises at least one of credit periods, start credits, end credits, lull points, time-based marked regions, location-based marked regions, context-based marked regions, explicit scene start and end, product placement opportunities or an ad duration, within the media content.

3. The system according to claim 1, wherein the circuitry is further configured to identify a presentation attribute for the overlay-graphic item based on the identified tag within the media content,
wherein the presentation attribute corresponds to at least a behavior, a position, or an interactivity of the overlay-graphic item, and
wherein the presentation attribute comprises a defined position within each frame of the media content, a resolution, a size, a transition effect, a digital video effect for the overlay-graphic item.

4. The system according to claim 1,
wherein the media stream is presented via an adaptive bitrate streaming technique based on a first variation in a bandwidth of the network.

5. The system according to claim 1, wherein the circuitry is further configured to:
transmit a request to the media presentation and distribution system,
wherein the request corresponds to streaming of the media content via the media stream, and
wherein the transmitted request is associated with a user of the media content; and
receive, based on the transmitted request, the media stream from the media presentation and distribution system.

6. The system according to claim 5,
wherein the tag is identified from a client manifest received from the media presentation and distribution system,
wherein the media stream is received via one of a hypertext transport protocol (HTTP) Live Streaming (HLS) format, Microsoft smooth streaming, Dynamic Adaptive Streaming over HTTP (DASH), Protected HTTP Dynamic Streaming (PHDS), Protected HTTP Live Streaming (PHLS), a real time messaging protocol (RTMP), and a digital streaming protocol, and
wherein the media content corresponds to a personalized playlist or a curated playlist of a media program based on the user-attribute.

7. The system according to claim 1, wherein the circuitry is further configured to render the overlay-graphic item based on the identified tag from a client manifest.

8. A system, comprising:
a memory for storing instructions; and
a circuitry in a media presentation and distribution system configured to execute the instructions, and based on the executed instructions, the circuitry is further configured to:
insert a tag in media content of a media stream based on a request received from a client device via a network,
wherein the inserted tag corresponds to an overlay-graphic item to be presented at the client device;
wherein the inserted tag is identified in the media content by the client device,
wherein a candidate time-period is identified within the media content by the client device based on the identified tag within the media content; and
instruct presentation of the overlay-graphic item at the candidate time-period in the media content based on a degree of correlation between the identified tag in the media content and a corresponding context for the media content at the candidate time-period.

9. The system according to claim 8, wherein the circuitry is further configured to:
determine a contextually relevant duration within the media content of the media stream; and
select the overlay-graphic item to be presented over the media content at the client device based on a context of the overlay-graphic item and the contextually relevant duration.

10. The system according to claim 8, wherein the circuitry is further configured to:
retrieve a set of user-attributes associated the client device; and
select the overlay-graphic item to be presented over the media content at the client device based on the retrieved set of user-attributes.

11. The system according to claim 8, wherein the request received from the client device is associated with user-attributes for the media content.

12. The system according to claim 8, wherein the circuitry is further configured to transmit, based on the received request, the media stream to the client device,
wherein the media stream comprises the media content and the inserted tag.

13. The system according to claim 8, wherein the circuitry is further configured to verify the presentation of the overlay-graphic item over the media content at the client device.

14. The system according to claim 8, wherein the overlay-graphic item is rendered based on a client manifest or the tag transmitted along with the media stream to the client device.

15. A method, comprising:
receiving, by a circuitry, a media stream from a media presentation and distribution system via a network,
wherein the received media stream comprises media content and a tag, and
wherein the media content comprises programming media content and non-programming media content;
identifying, by the circuitry, the tag in the media content based on a user-attribute of a client device;
wherein the identified tag corresponds to an overlay-graphic item;
identifying, by the circuitry, a candidate time-period in a playback duration of the media content based on the identified tag in the media content; and transmitting, by the circuitry, a selection request to the media presentation and distribution system for selection of the candidate time-period in the media content, wherein the candidate time-period is selected based on the tag at a specified time in the media content; and presenting, by the circuitry, the overlay-graphic item at the candidate time-period in the media content based on a degree of correlation between the identified tag in the media content and a corresponding context for the media content at the candidate time-period.

16. The method according to claim 15, further comprising:

transmitting, by the circuitry, a request to the media presentation and distribution system, wherein the request corresponds to streaming of the media content via the media stream, and wherein the transmitted request is associated with the user-attribute for the media content; and receiving, by the circuitry, based on the transmitted request, the media stream from the media presentation and distribution system.

17. The method according to claim 15, further comprising rendering, by the circuitry, the overlay-graphic item based on the identified tag from a client manifest.

18. The method according to claim 16, wherein the request, received from the client device by the media presentation and distribution system, is associated with the user-attribute for the media content.

19. The method according to claim 15, wherein the media stream is transmitted by the media presentation and distribution system to the client device, and wherein the media stream comprises the media content and the tag.

20. The method according to claim 15, wherein the presentation of the overlay-graphic item over the media content is verified by the media presentation and distribution system at the client device.

* * * * *

UNITED STATES PATENT AND TRADEMARK OFFICE
CERTIFICATE OF CORRECTION

| | |
|---|---|
| PATENT NO. | : 11,632,589 B2 |
| APPLICATION NO. | : 17/688666 |
| DATED | : April 18, 2023 |
| INVENTOR(S) | : Donald Jude Loheide et al. |

It is certified that error appears in the above-identified patent and that said Letters Patent is hereby corrected as shown below:

On the Title Page

(54) and in the Specification, Column 1, Line 1-2, "CLIENT-SIDE OVERLAY OF GRAPHIC HEMS ON MEDIA CONTENT"

Should be:
--CLIENT-SIDE OVERLAY OF GRAPHIC ITEMS ON MEDIA CONTENT--

Signed and Sealed this
Third Day of October, 2023

*Katherine Kelly Vidal*

Katherine Kelly Vidal
*Director of the United States Patent and Trademark Office*